Figure 3:
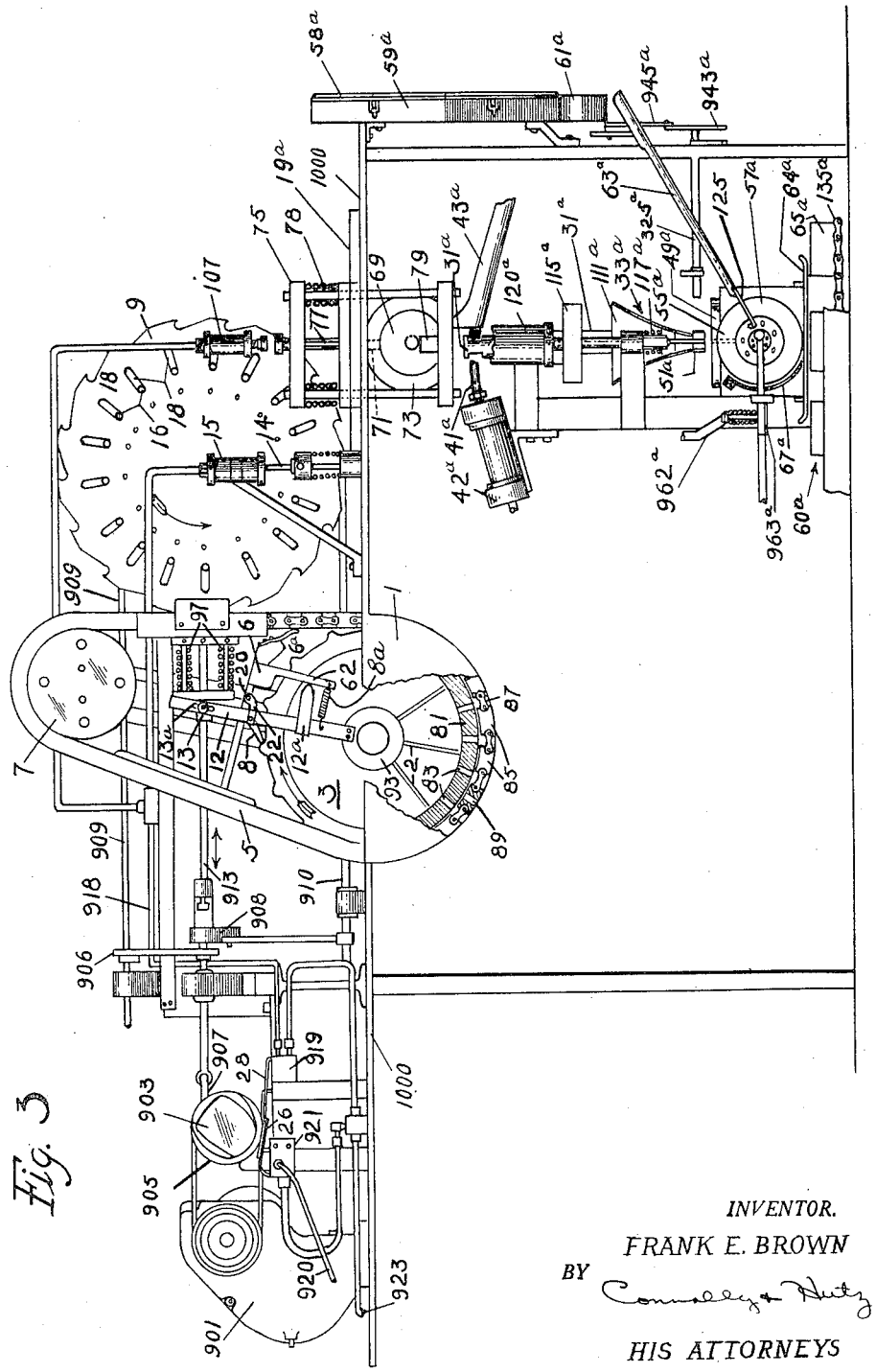

Oct. 9, 1956            F. E. BROWN            2,765,606

MACHINE FOR ASSEMBLING HYPODERMIC SYRINGES

Filed Sept. 13, 1953            21 Sheets-Sheet 1

FIG. 1

*INVENTOR.*
FRANK E. BROWN
BY
*HIS ATTORNEYS*

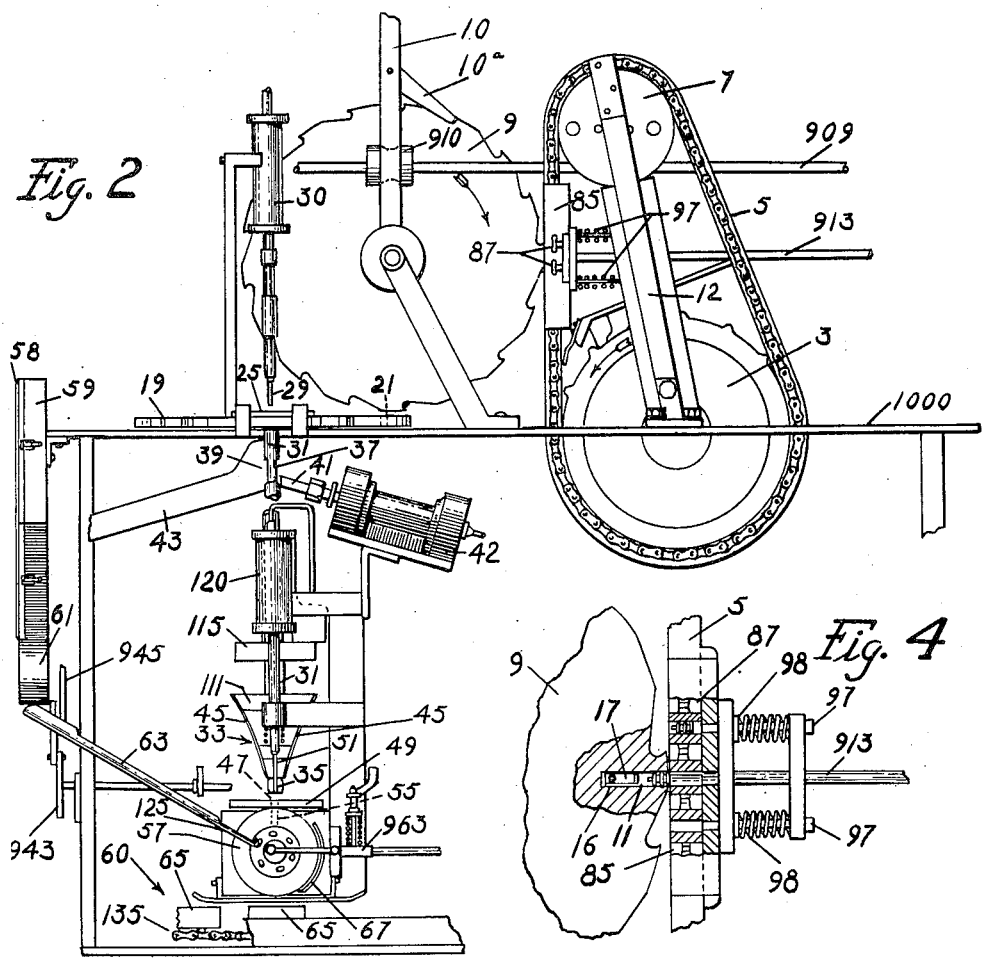

Oct. 9, 1956 F. E. BROWN 2,765,606
MACHINE FOR ASSEMBLING HYPODERMIC SYRINGES
Filed Sept. 13, 1953 21 Sheets-Sheet 3
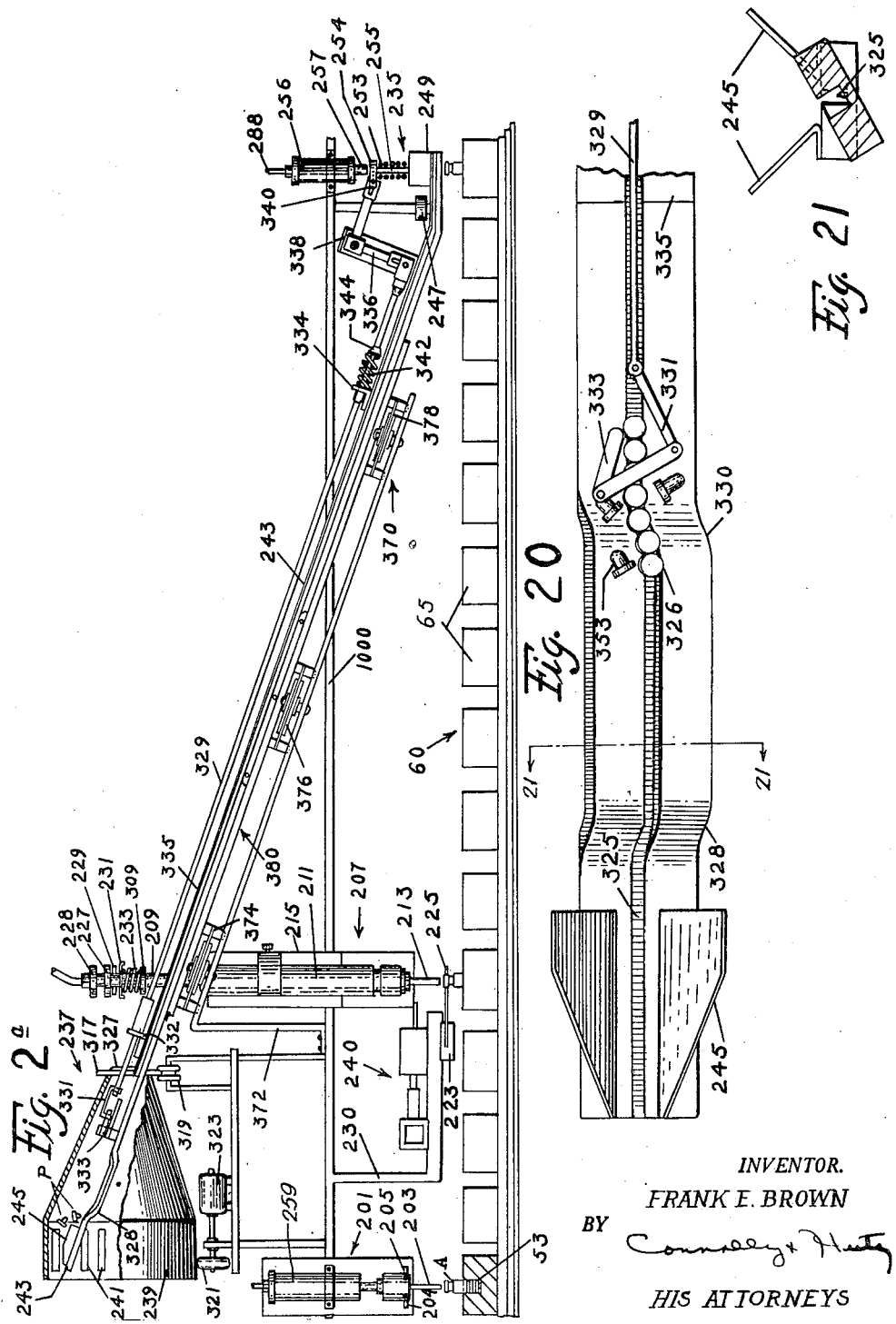
INVENTOR.
FRANK E. BROWN
BY
HIS ATTORNEYS

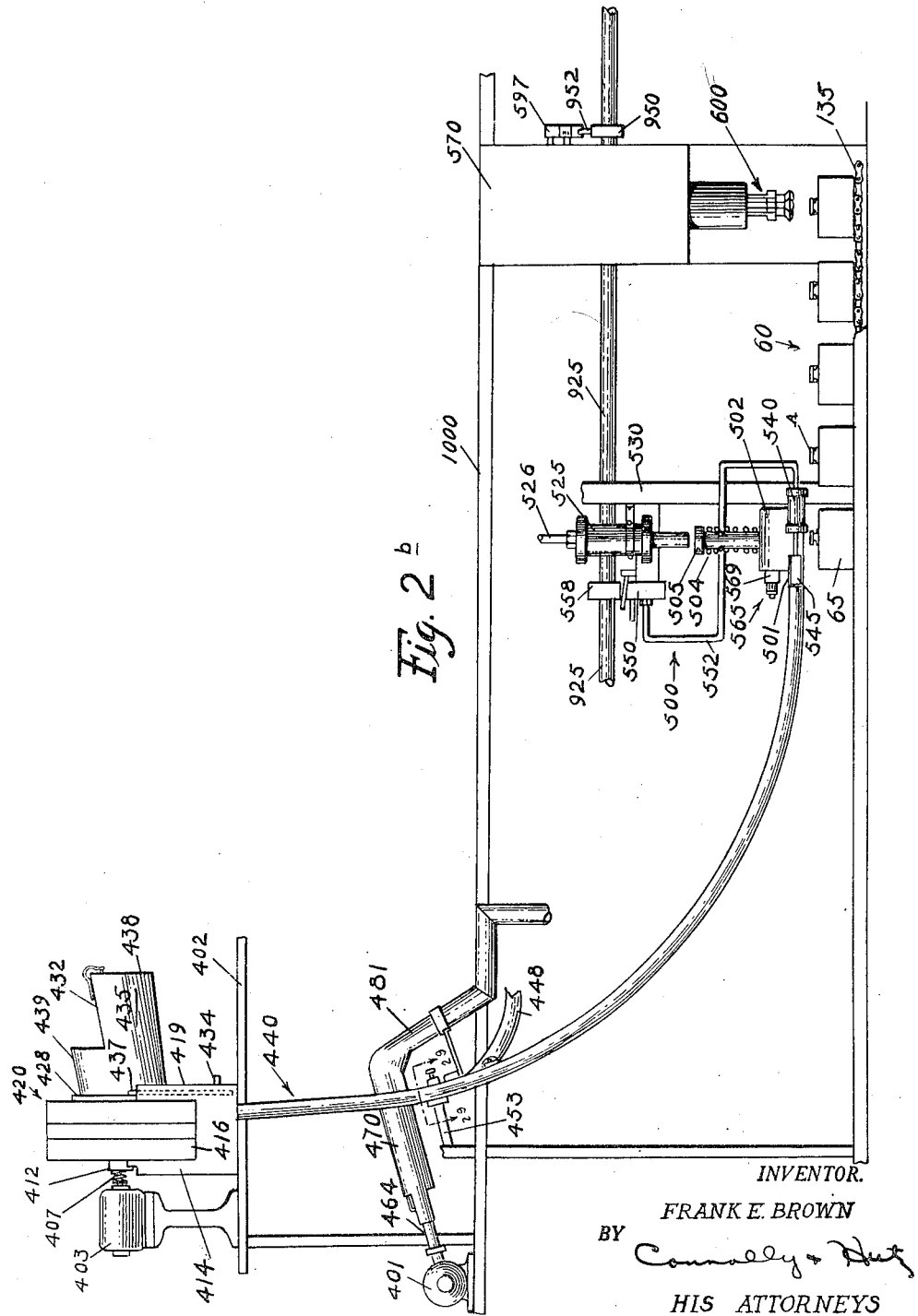

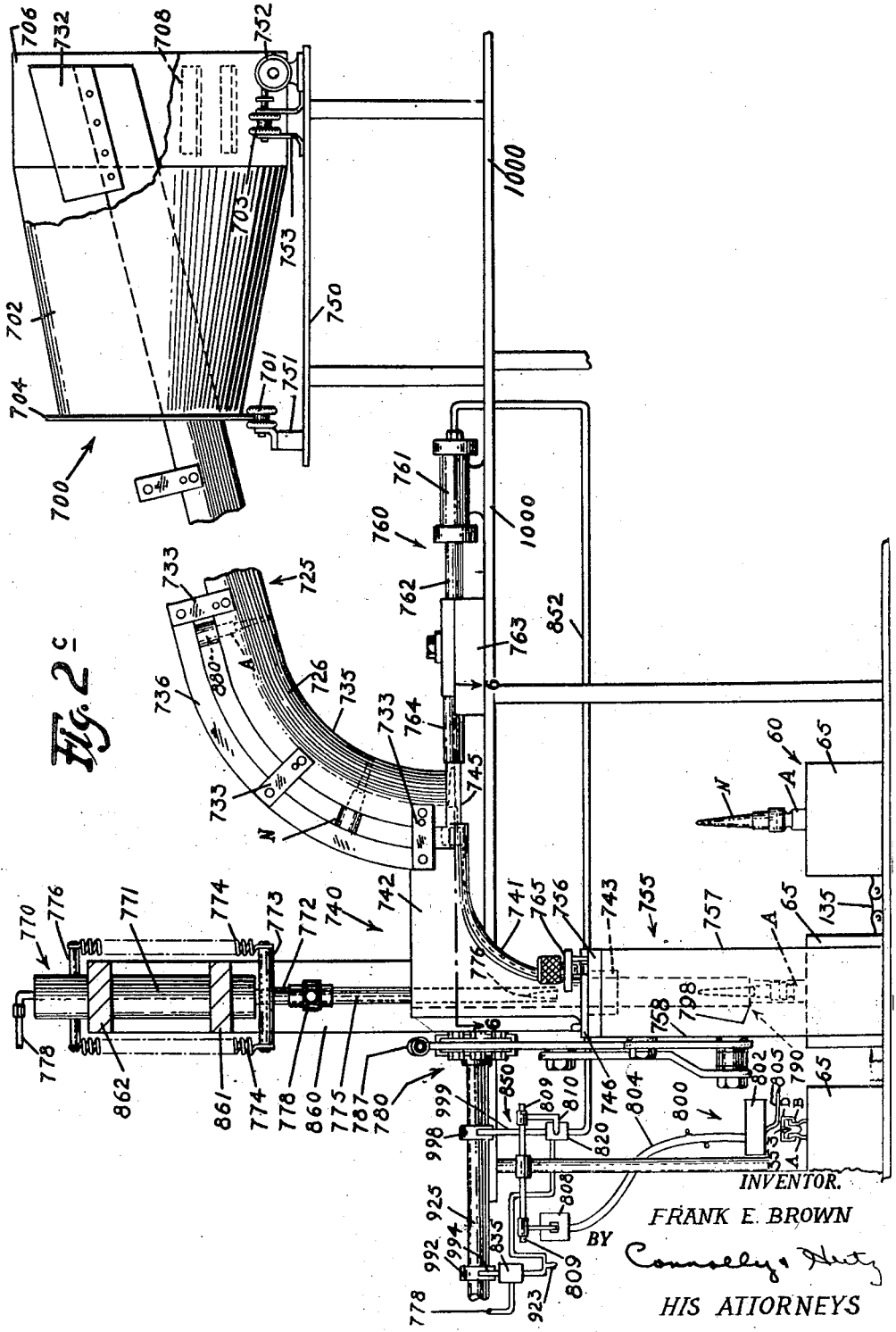

Oct. 9, 1956　　　F. E. BROWN　　　2,765,606
MACHINE FOR ASSEMBLING HYPODERMIC SYRINGES
Filed Sept. 13, 1953　　　21 Sheets-Sheet 6

INVENTOR.
FRANK E. BROWN
BY Connolly & Hutz
HIS ATTORNEYS

Oct. 9, 1956  F. E. BROWN  2,765,606
MACHINE FOR ASSEMBLING HYPODERMIC SYRINGES
Filed Sept. 13, 1953  21 Sheets-Sheet 7
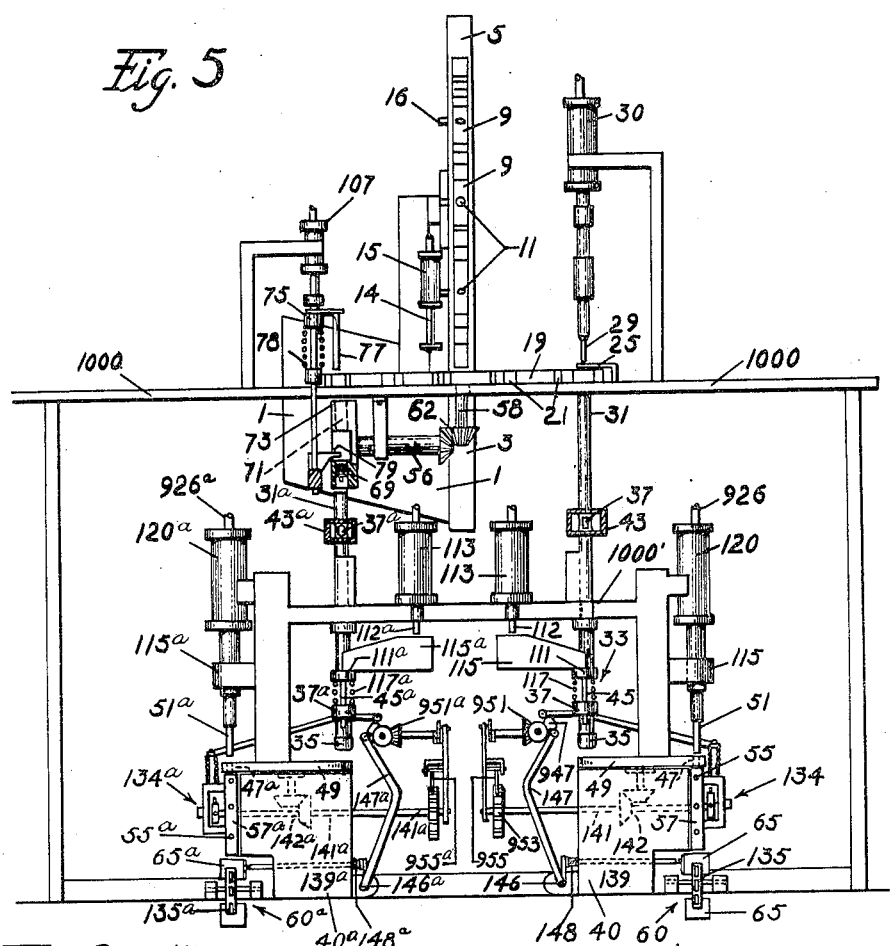
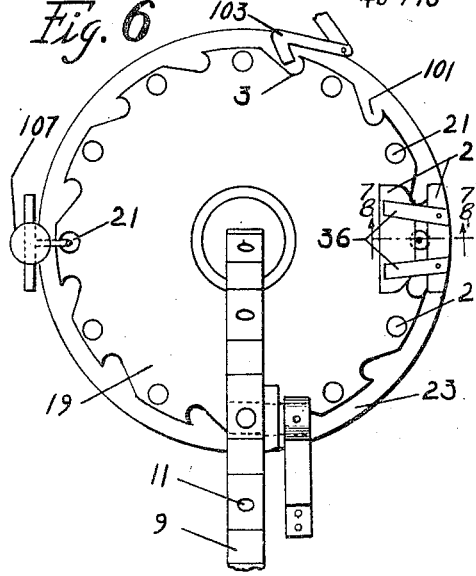
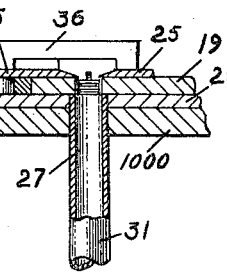
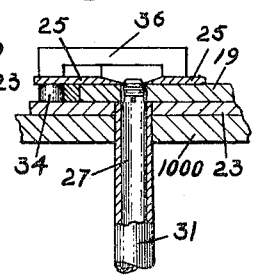
INVENTOR.
FRANK E. BROWN
BY Connolly
HIS ATTORNEYS Oct. 9, 1956 — F. E. BROWN — 2,765,606
MACHINE FOR ASSEMBLING HYPODERMIC SYRINGES
Filed Sept. 13, 1953

INVENTOR.
FRANK E. BROWN
BY
HIS ATTORNEYS

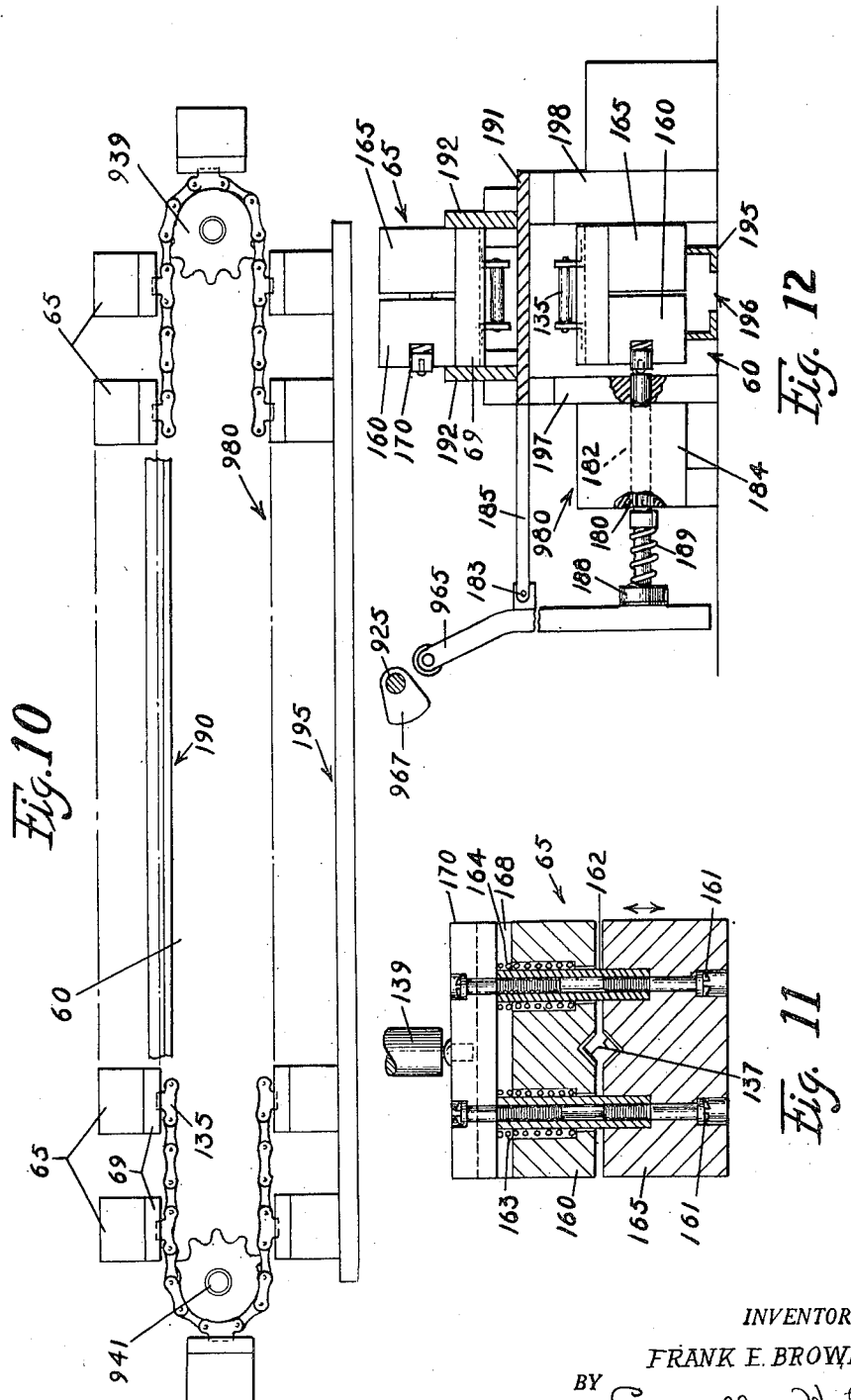

Oct. 9, 1956  F. E. BROWN  2,765,606
MACHINE FOR ASSEMBLING HYPODERMIC SYRINGES
Filed Sept. 13, 1953  21 Sheets-Sheet 10
Fig. 13
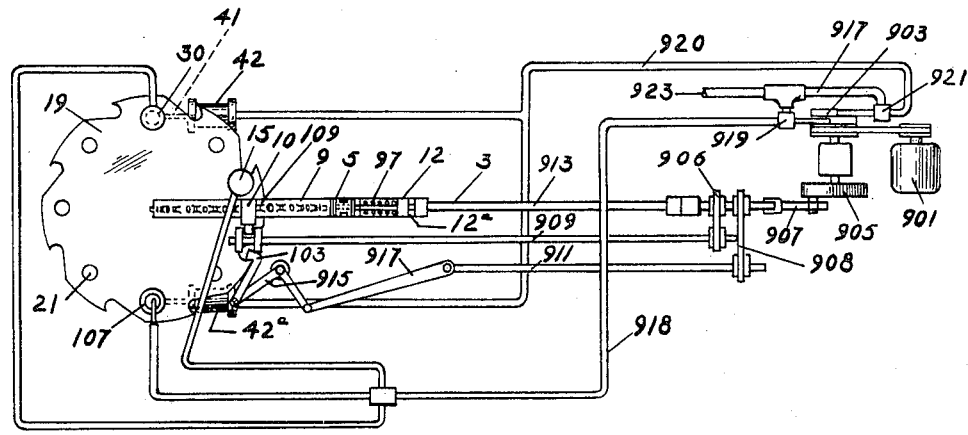
Fig. 14
Fig. 15
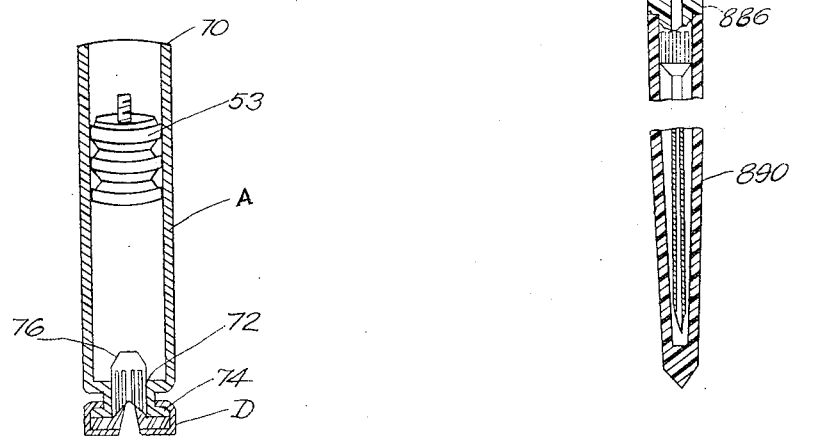
INVENTOR.
FRANK E. BROWN
BY
HIS ATTORNEYS

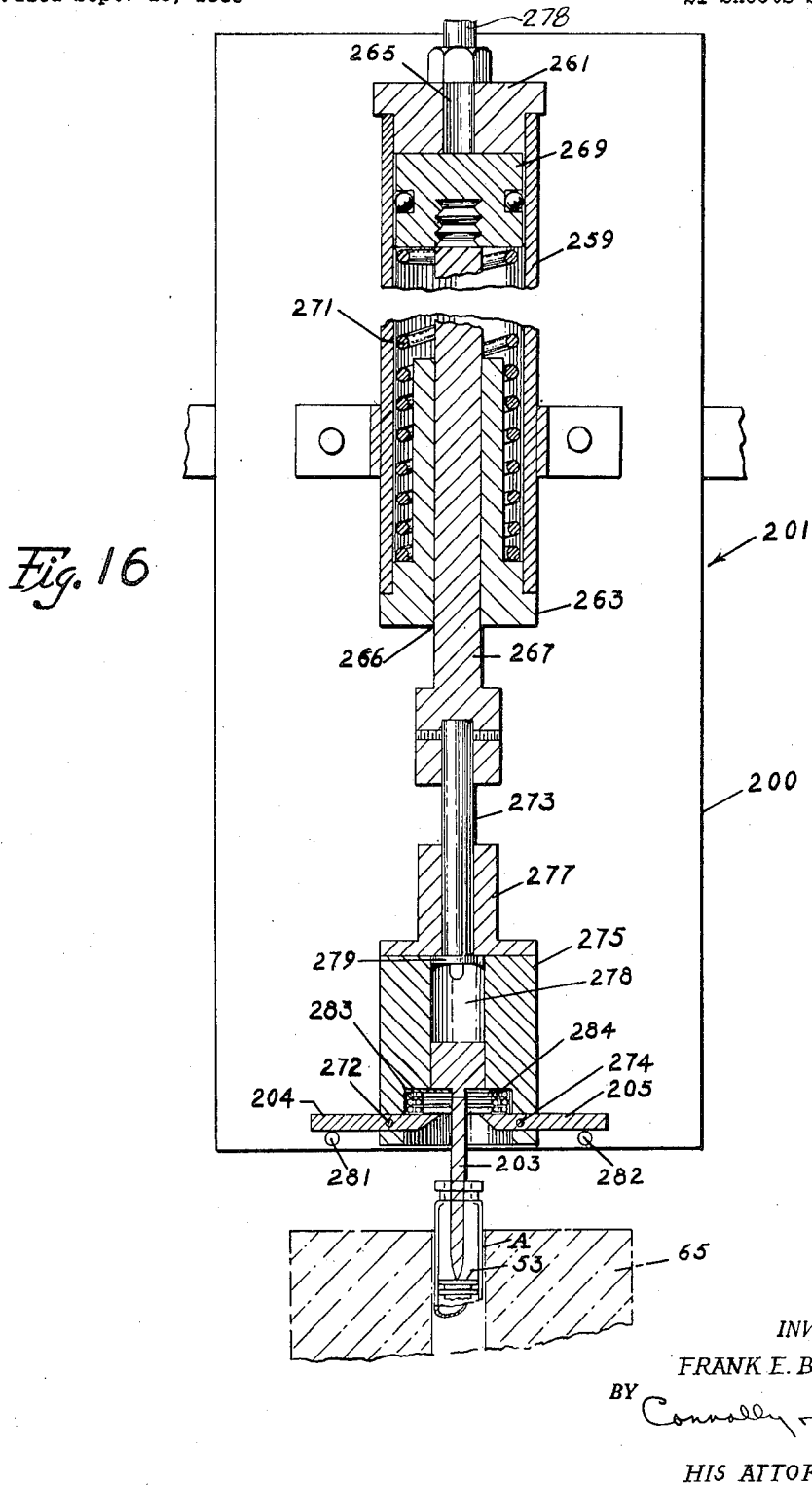

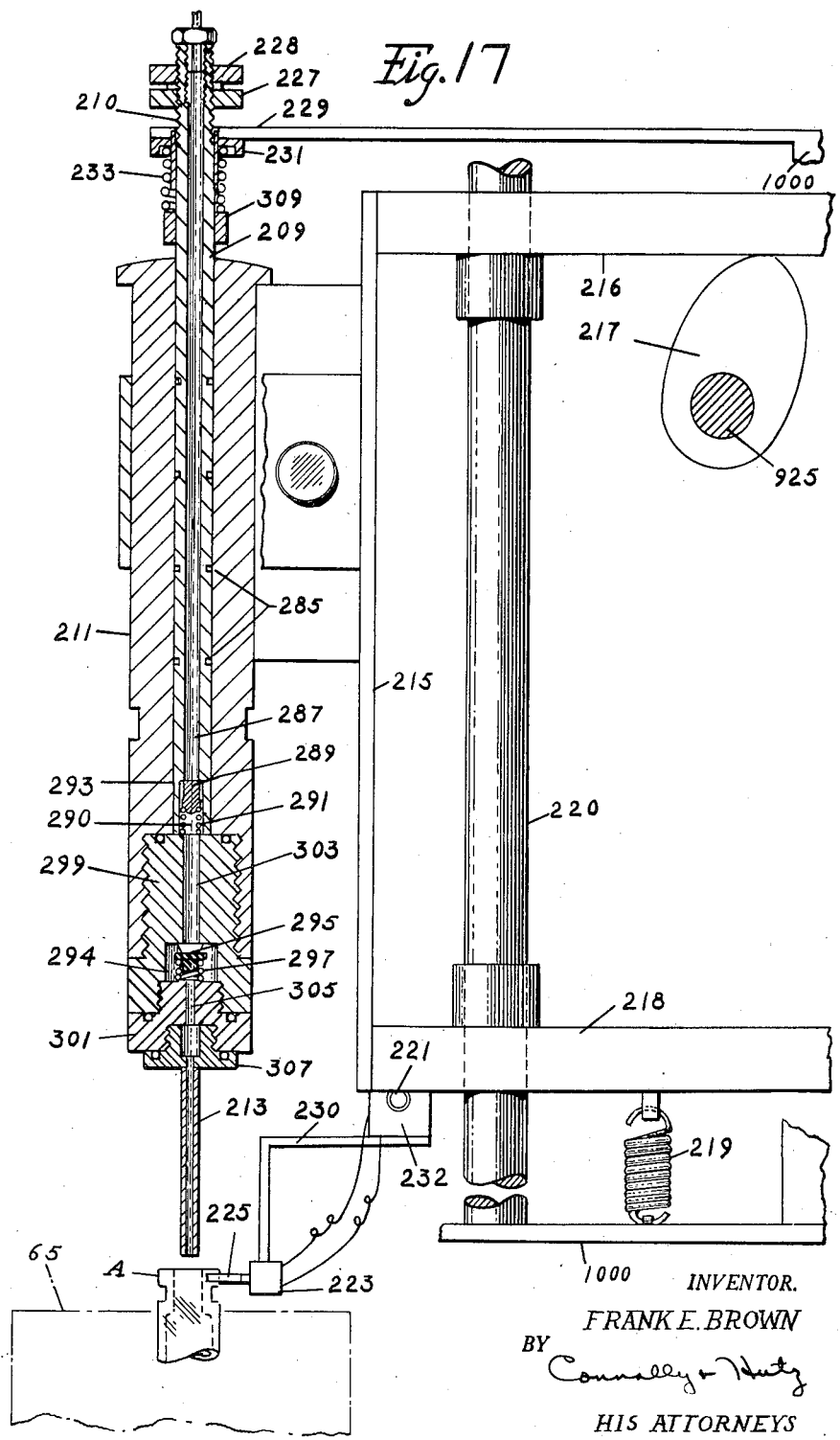

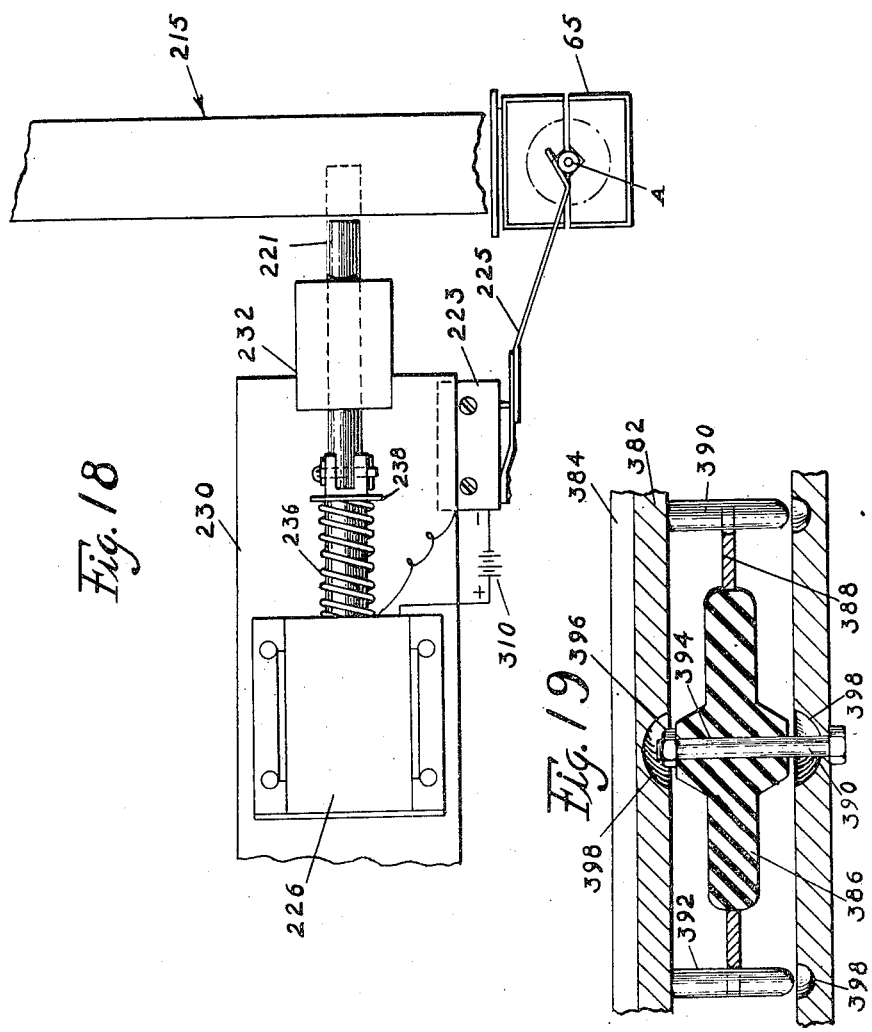

Oct. 9, 1956     F. E. BROWN     2,765,606
MACHINE FOR ASSEMBLING HYPODERMIC SYRINGES
Filed Sept. 13, 1953     21 Sheets-Sheet 14
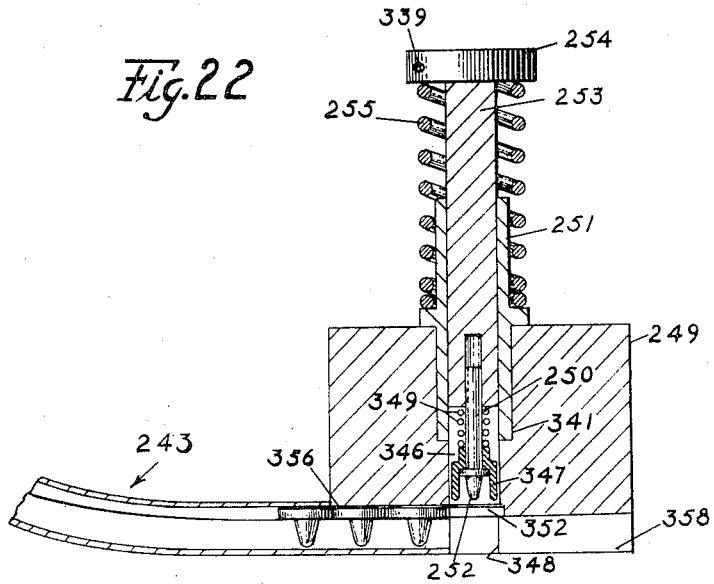
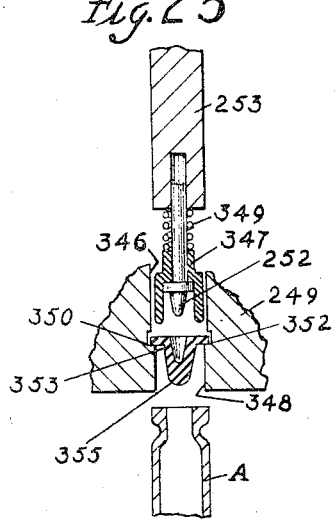
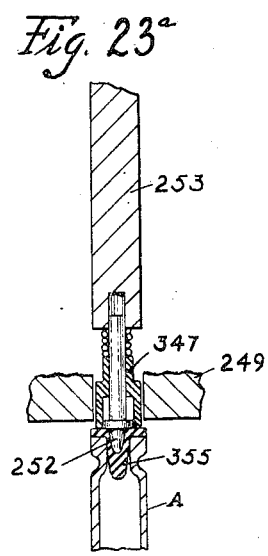
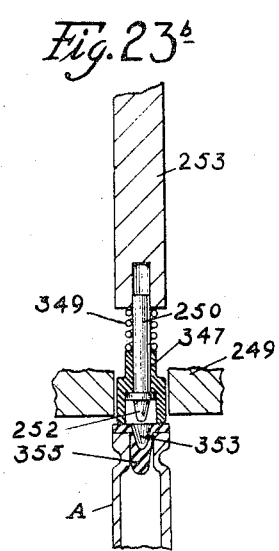
INVENTOR.
FRANK E. BROWN
BY
HIS ATTORNEYS

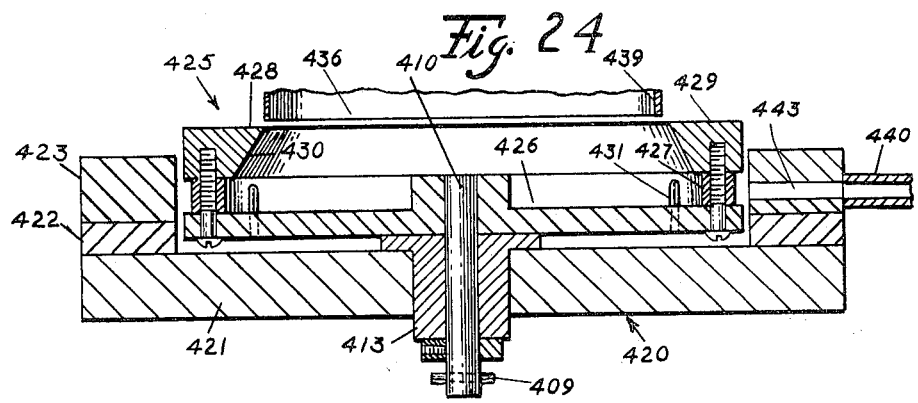
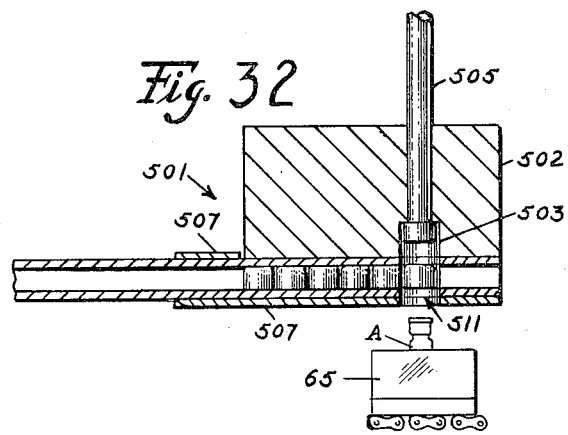
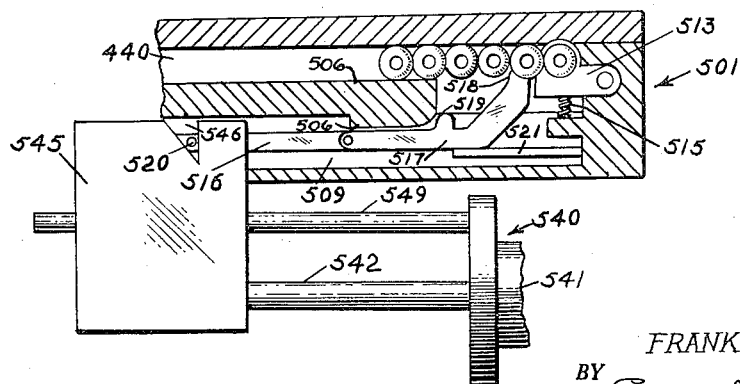
INVENTOR.
FRANK E. BROWN
BY
HIS ATTORNEYS

Oct. 9, 1956 F. E. BROWN 2,765,606
MACHINE FOR ASSEMBLING HYPODERMIC SYRINGES
Filed Sept. 13, 1953 21 Sheets-Sheet 16
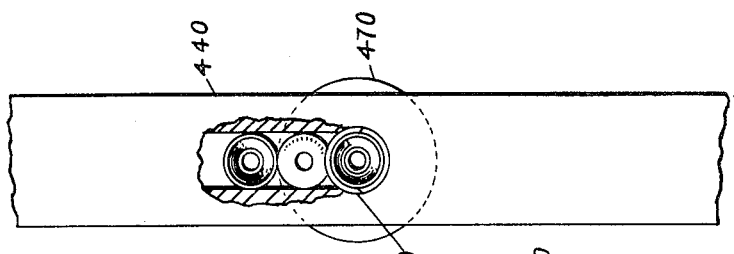
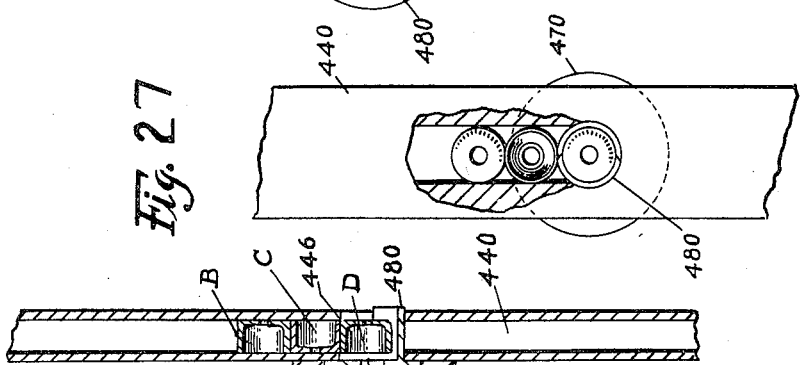
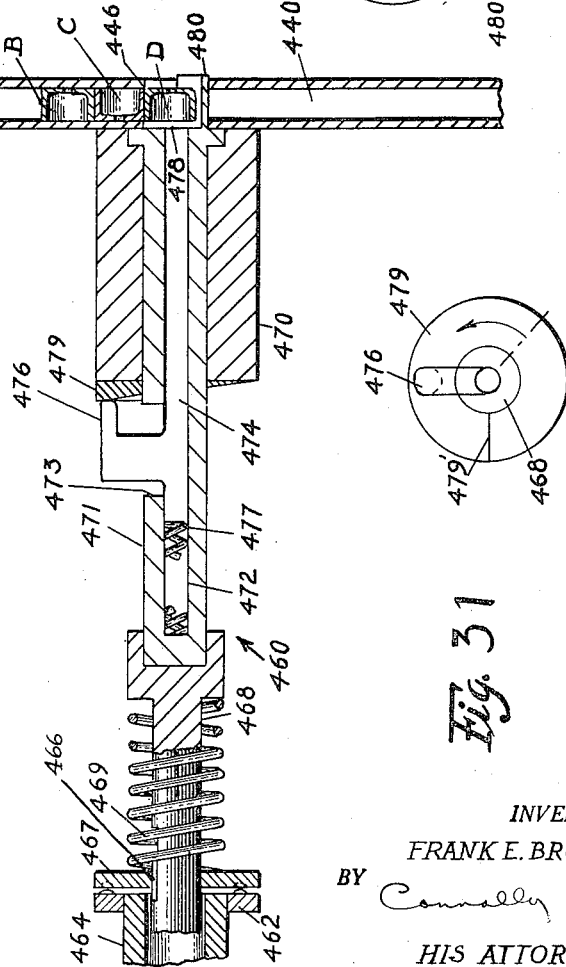
INVENTOR.
FRANK E. BROWN
BY
HIS ATTORNEYS Oct. 9, 1956 F. E. BROWN 2,765,606
MACHINE FOR ASSEMBLING HYPODERMIC SYRINGES
Filed Sept. 13, 1953 21 Sheets-Sheet 17
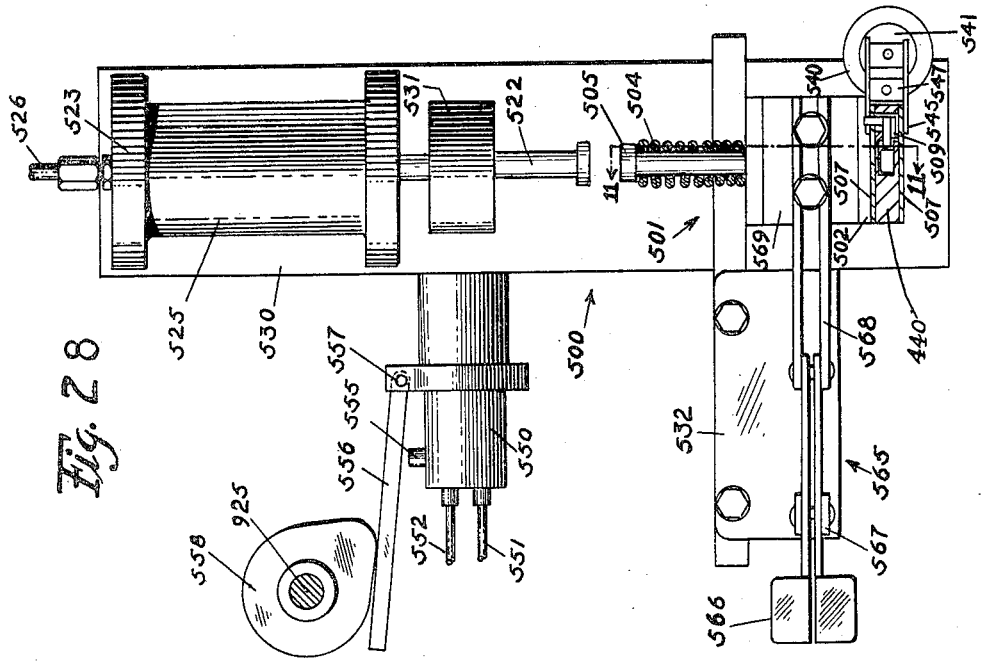
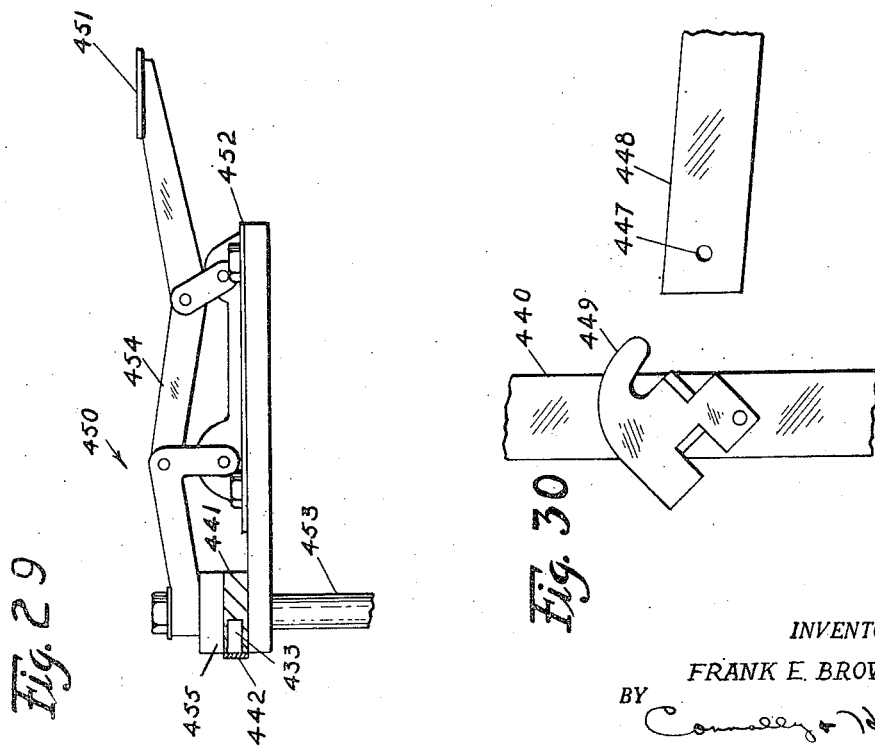
INVENTOR.
FRANK E. BROWN
BY
HIS ATTORNEYS

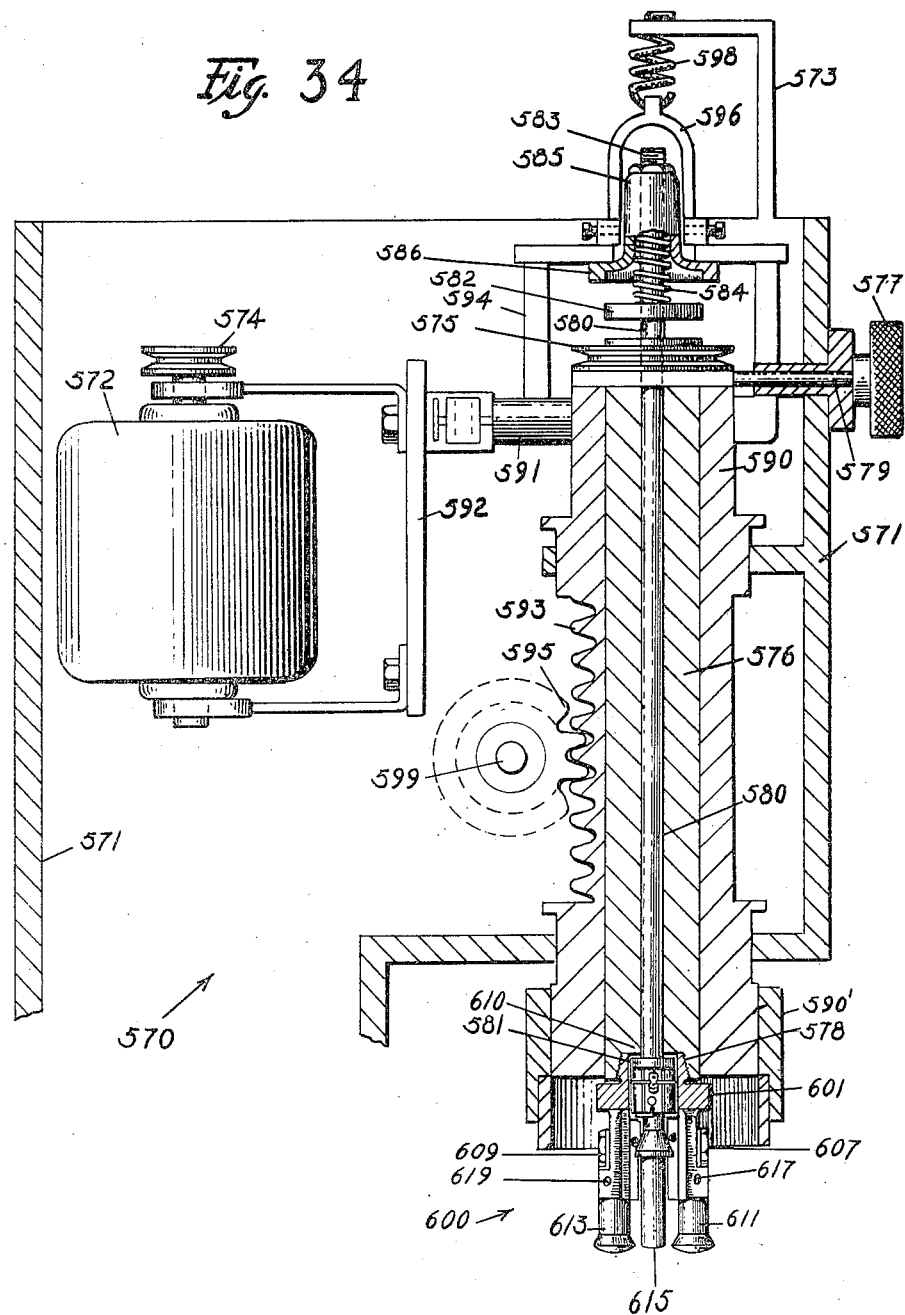

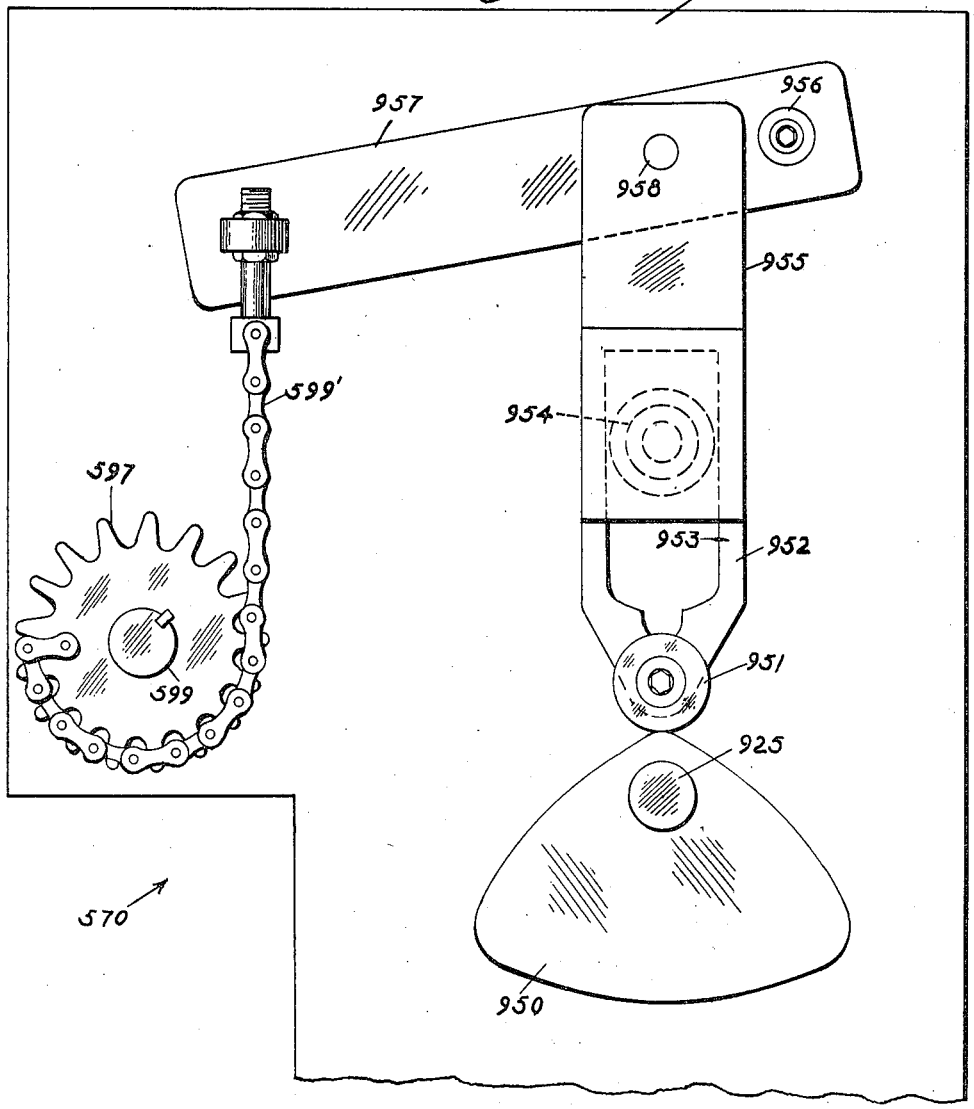

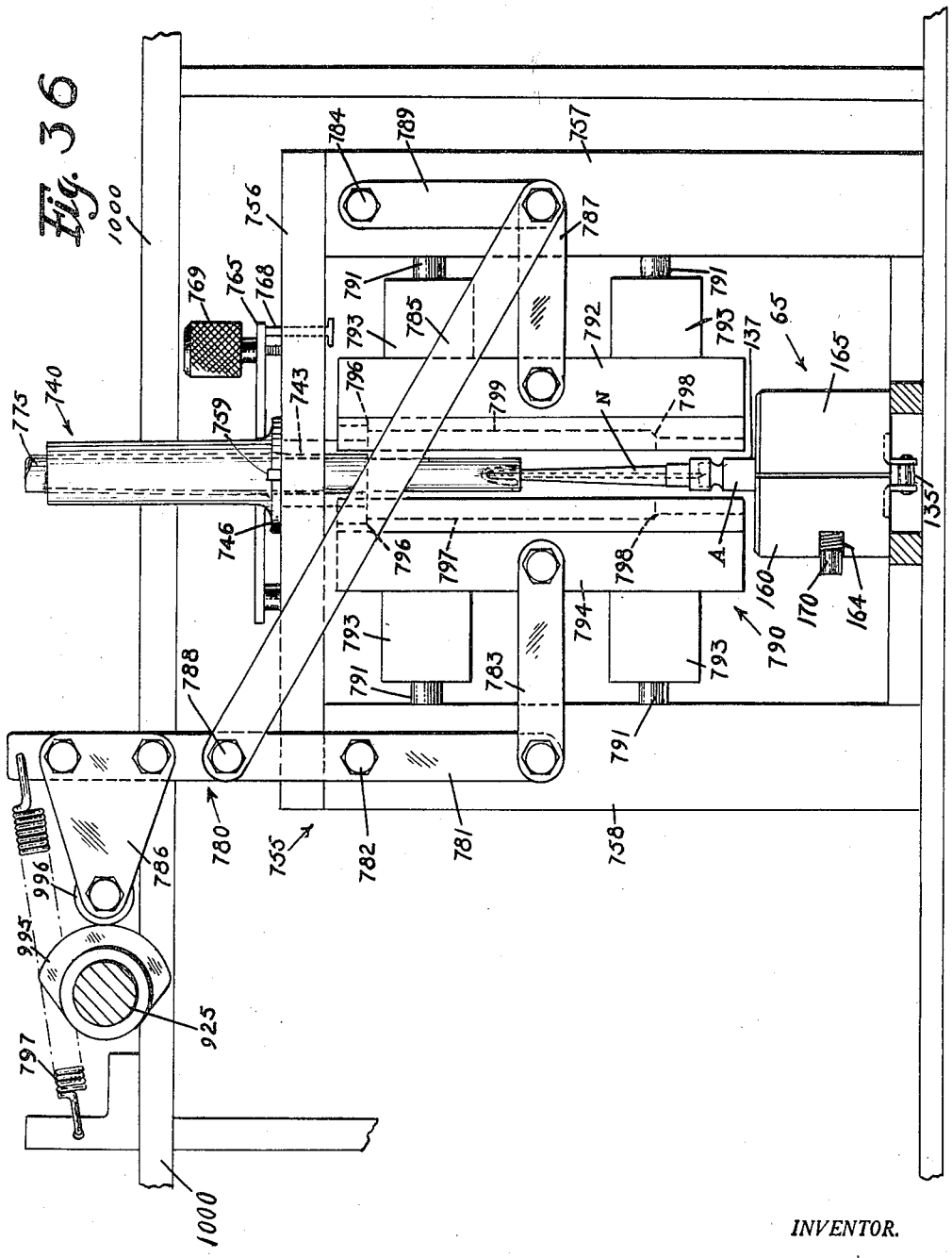

Oct. 9, 1956   F. E. BROWN   2,765,606
MACHINE FOR ASSEMBLING HYPODERMIC SYRINGES
Filed Sept. 13, 1953   21 Sheets-Sheet 21

INVENTOR.
FRANK E. BROWN
BY
HIS ATTORNEYS

United States Patent Office 2,765,606
Patented Oct. 9, 1956

2,765,606

MACHINE FOR ASSEMBLING HYPODERMIC SYRINGES

Frank E. Brown, Burbank, Calif., assignor to Chas. Pfizer & Co., Inc., Brooklyn, N. Y., a corporation of Delaware Application September 13, 1954, Serial No. 455,564

11 Claims. (Cl. 53—202)

This invention relates to a machine for assembling hypodermic syringes. More particularly, this invention relates to a fully automatic assembling, filling and sealing machine which is capable of fabricating a disposable hypodermic syringe cartridge with attached dispensing needle in an uninterrupted operation at a high output rate. Specifically, the invention relates to an apparatus for assembling a disposable combined medicament-containing ampule and attached sterile dispensing needle in an automatic operation devoid of manual manipulations.

Copending applications are filed by this same inventor which relate to details of specific portions of the overall machine disclosed and claimed in this application. These copending applications were filed concurrently with this present application on September 13, 1954. Copending application Ser. No. 455,565 relates to details of the vial feeding, conveyor transporting, and plunger stopper applying mechanism; copending application 455,566 relates to details of the filling and closure stopper applying mechanism; copending application 455,567 relates to the details of the metallic ferrule applying mechanism; and copending application 455,568 relates to details of the mechanism for feeding, orientation and application of the covered hypodermic needles.

Although many types of hypodermic syringes have been long known in the art for the administration of various medicaments, the majority of the operations associated with the manufacture of the syringes are, even to this day, performed by hand. In a few limited instances, one or two of the operations have been partially mechanized, but before the advent of the instant invention, complete mechanization had not been achieved. A particular difficulty precluding application of well-known automatic packaging techniques, commonplace in other non-analogous arts, has been the critical importance attached to the necessity for maintaining substantially complete sterility during the assembling, filling and sealing operations. A crucial condition in this requirement, which has heretofore prevented application of automatic packaging techniques on either a practical or economical basis, has been the fact that the component parts of any such machine must be readily disconnectable for sterilization and decontamination, and must be capable of retaining such condition over extended periods of operation. The enormity of this obstacle will become apparent when cognizance is taken of the difficulty encountered in retaining sterile conditions in even a small cubic content of any given air space with the result that it has heretofore been impossible to realize a machine of such small size as to be capable of being protected against contamination on an economically practicable basis.

A further difficulty encountered in prior attempts to mechanize the manufacture of disposable hypodermic syringes has been an inability to simplify the problem of orienting and conveying the many delicate or complex parts while simultaneously maintaining the necessary sterile technique. Additional problems have been encountered in arranging an apparatus which is of simplified construction so as to be capable of being disassembled in a relatively easy manner without interrupting the operation of the apparatus over an extended period of time. Further difficulties inherent in such type apparatus reside in the problems of accurately positioning and orienting relatively minute components of resilient material, such as the usual rubber stopper end closures and the like.

Applicant, on the other hand, has fully overcome these problems by devising a simplified machine which is capable of collecting, collating, orienting and combining the various component parts of a disposable syringe cartridge and attached dispensing needle into a completed article ready for immediate sale in an uninterrupted sequence of operations. Broadly, the automatic machine according to the invention includes a pair of parallel conveyor lines for transporting and supporting a plurality of open-ended cylindrical glass vials or ampules in a predetermined sequence, a pair of removable storage chambers for retaining and continuously supplying the glass vials through chute-like feed means to parallel identical first assembly stations cooperating with said parallel conveyor lines. Each of the said first assembly stations includes a structure for receiving the vials from the feed chute and for receiving predeterminedly oriented rubber plunger stopper members from a supply structure including means for orienting and feeding the plunger stopper members to each of said stations in a predetermined spacial relationship. Each of said first assembly stations further includes mechanism for applying the closure stoppers to a large open end of the vial to form a hermetical seal therein. After insertion of the plunger stoppers, the vials are deposited in sequence in the blocks on the respective conveyors and are transported to a second station where an insepection operation occurs to determine if the plungers were properly inserted, and if not, to eject the defective vials from the line. Thereafter, the vials proceed through a third station for automatic filling, and subsequently to a fourth station including structure for applying end stoppers in the vials. The end stoppers are synchronously fed to the applying mechanisms from independent storage hoppers through feed chutes having structure for detecting and ejecting improperly oriented stoppers. The filled vials then proceed to closure cap positioning stations where perforated, metallic ferrules are applied over the end stoppers and then to cap sealing stations where the ferrules are spun into a gas-tight, friction-fit seal over the end stoppers. Thereafter, the cartridges proceed to final assembly stations where sheath protected needles are selectively fed and applied to the ends of the cartridge assemblies, the protected needles being supplied from independent storage hoppers in a predetermined oriented relationship to a unique applying apparatus operating synchronously with the conveyors.

Ultimately, the completed combined ampule and needle units are discharged from the conveyors by identical ejection mechanisms which operate upon the vial supporting blocks of the conveyor on the return run of the conveyor to gravity discharge the completed assembly into a conventional collecting structure, as for example, a delivery chute to a packaging department.

One of the unique and totally unexpected advantages of the instant invention is the application of a dual chain type conveyor mechanism for supporting and transporting a plurality of relatively fragile glass cylinders, the mechanism being so arranged as to support the cylinders during the performance of various operations thereon without incurring breakage. Although chain conveyor units have long been used in various arts, including well-known automatic packaging techniques, it is believed that the present invention is the first in the field to apply such common-place structure to the assembly of extremely delicate components resulting in at least a two-fold increase in the number of units assembled per hour, as compared with known packaging apparatus of equivalent size.

Another feature of the invention resides in the provision of a machine for performing the above-described operations in which precise control of all movements of the component parts is accurately controlled by a simplified cam and follower mechanism which also provides driving power for selected stations in the machine.

Yet another feature of the invention is the provision of both independent and interrelated supply arrangements for feeding the components of the cartridge assembly to the proper stations in such manner as to avoid jamming by oversupply, or defective assemblies by undersupply.

It is therefore a prime object of the present invention to provide an economical automatic packaging machine for making disposable hypodermic syringe assemblies.

Figure 9:
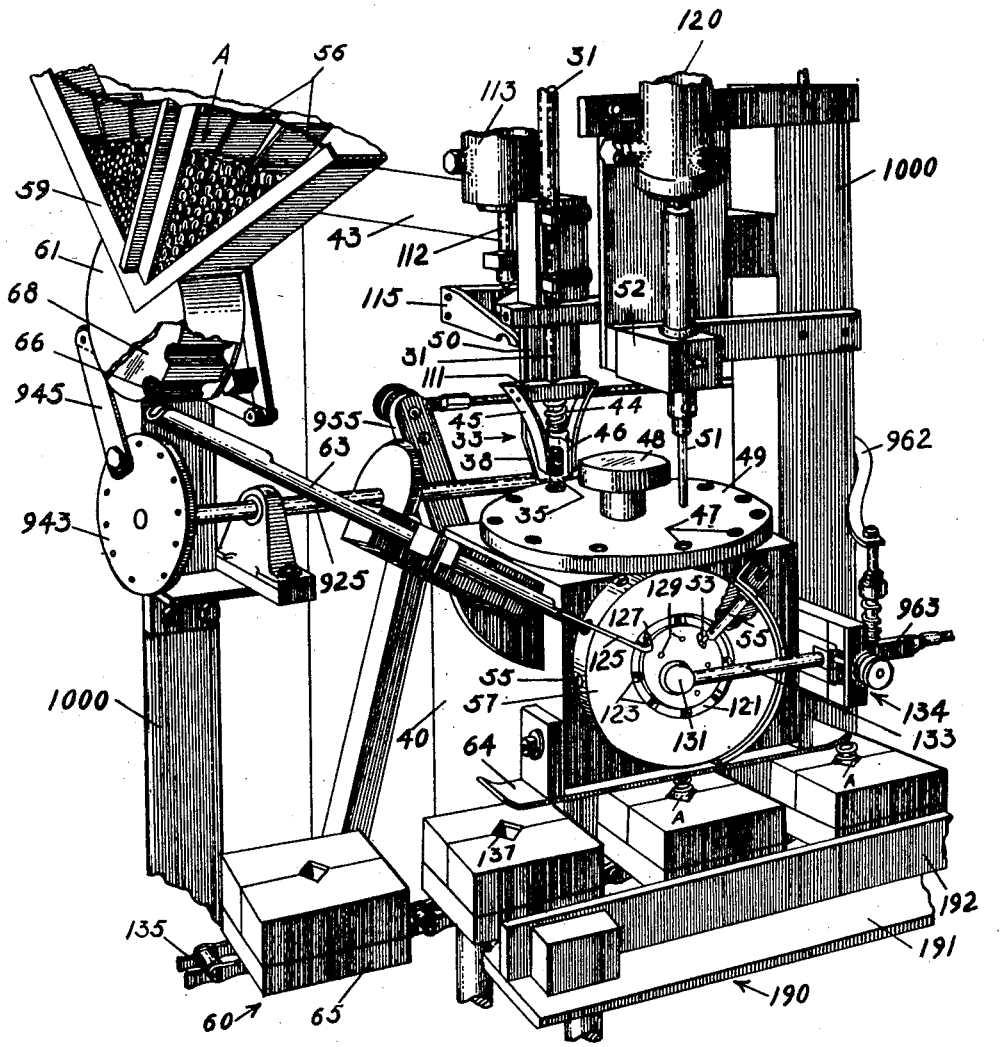

Other and distinct objects will become apparent from the description and claims which follow in connection with the annexed drawings, and in which:

Fig. 1 is a diagrammatic view illustrating the various operations performed by the assembling machine comprising a preferred embodiment of the invention, Fig. 2 is a partial side elevation view illustrating the major components of the machine for performing the vial and plunger stopper feeding and assembling operations, Fig. 2a is a partial side elevation view of the machine taken adjacent to Fig. 2 and illustrating the major components for performing the filling and closing operations, Fig. 2b is a partial side elevation view of the machine adjacent to Fig. 2a and illustrating the major components for performing the sealing operation, Fig. 2c is a partial side elevation view of the machine taken adjacent to Fig. 2b and illustrating the major components for performing the needle applying operation, Fig. 3 is a similar side elevation view illustrating the major components of Fig. 2 from the other side of the machine, Fig. 4 is a fragmentary view, partly in section, illustrating a detail of the machine, Fig. 5 is a front elevational view of the machine with the vial feeding structure removed, Fig. 6 is a top plan view of part of the plunger stopper orientation mechanism of the machine, Figs. 7 and 8 are fragmentary sectional views along the lines 7—7, 8—8 of Fig. 6, Fig. 9 is a perspective view illustrating the mechanism for operatively assembling the plunger stoppers into the glass vials, Fig. 10 is a fragmentary schematic view of the chain conveyor mechanism of the machine, Fig. 11 is a sectional view showing the details of construction of the article supporting blocks of the conveyor, Fig. 12 is a schematic view illustrating the discharge mechanism of the machine, Fig. 13 is a schematic illustration of the drive and control mechanism for the plunger stopper feeding and orientation mechanism of the machine, Fig. 14 is a side view, partly in section, of the novel disposable hypodermic syringe cartridge which is assembled by the machine of the invention, Fig. 15 is a side elevation view, partly in section, of the sterile needle assembly which is adapted to be combined with the cartridge unit of Fig. 14 by the machine of the invention to form an integral disposable hypodermic syringe assembly, Fig. 16 is an elevation view, partly in section, showing the details of the plunger inspection device of Fig. 2a, Fig. 17 is an elevation view, partly in section, showing the details of the filling device of Fig. 2a and the control mechanism therefor, Fig. 18 is a plan view of the electrical control mechanism of Fig. 17, Fig. 19 is a partial sectional view along the center of the resilient support for the closure stopper feed chute mechanism of Fig. 2a, Fig. 20 is a plan view of a portion of the closure stopper orientation mechanism of Fig. 19.

Figure 37:
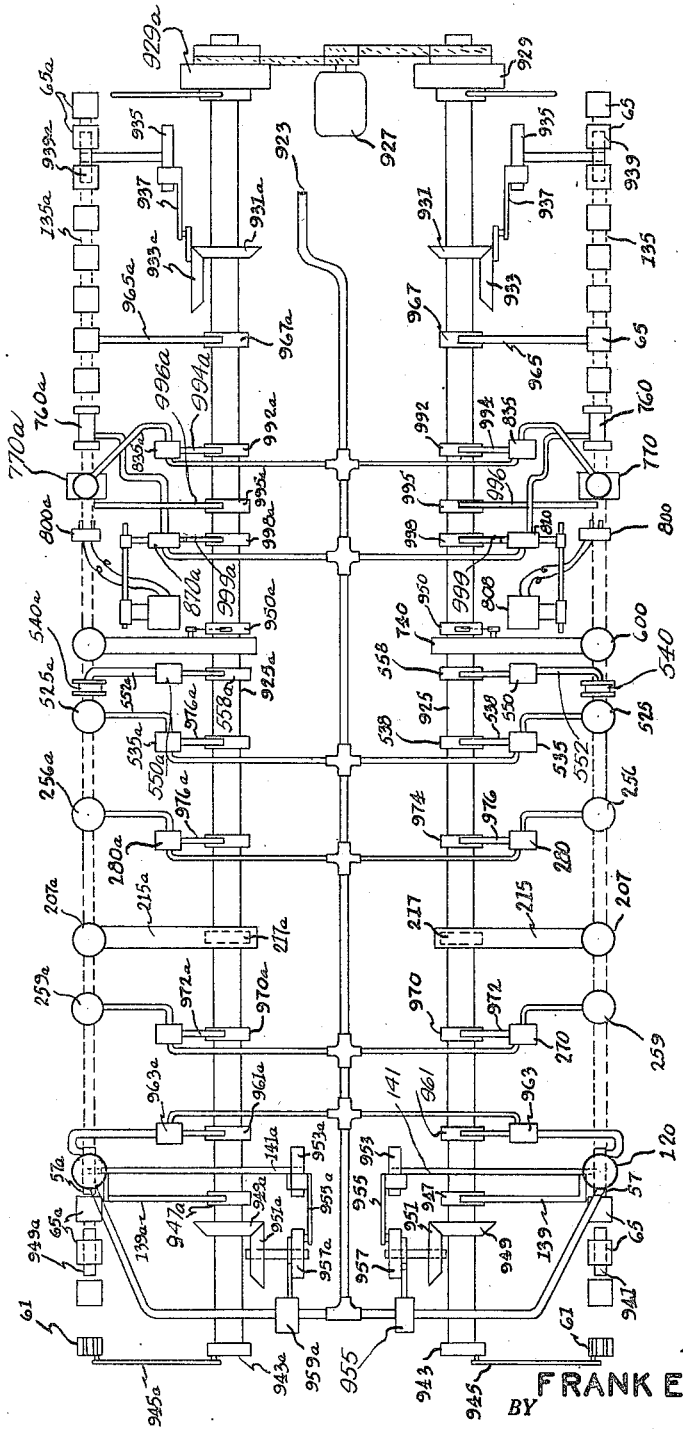

Fig. 21 is a section view along line 21—21 of Fig. 20,

Fig. 22 is an elevation view, partly in section, showing the details of the closure stopper insertion mechanism of Fig. 2a, Figs. 23–23b are schematic representations illustrating the various stages of operation of the closure stopper insertion mechanism of Fig. 22, Fig. 24 is a sectional view along the center line of the closure cap feeding mechanism of Fig. 2b, Fig. 25 is a sectional view, partly in elevation for the sake of clarity, of the closure cap sorting mechanism, Figs. 26 and 27 are plan views, partly in section, illustrating the cap sorting mechanism of Fig. 25 in separate stages of operation, Fig. 28 is an end view, partly in section, of the closure cap positioning and applying mechanism, Fig. 29 is a sectional view along the line 29—29 of Fig. 2b, Fig. 30 is a schematic view of the closure cap feed chute arrangement, Fig. 31 is a schematic end view of the control cam arrangement for the sorter mechanism of Fig. 25, Fig. 32 is a vertical sectional view of the cap positioning and applying mechanism along the line 32—32 of Fig. 28, Fig. 33 is a transverse section view, partly in elevation, of the cap positioning and applying mechanism, Fig. 34 is a section view, partly in elevation, of the spinning mechanism, Fig. 35 is a side elevational view of the cap spinning mechanism illustrating the control components, Fig. 36 is a front elevation view illustrating the needle positioning mechanism of the machine of Fig. 2c, and Fig. 37 is a schematic view illustrating the drive and control mechanism for the various associated mechanisms of the machine of the invention.

The disposable cartridge assembly which is adapted to be formed by the machine of the present invention is more particularly described in my copending application, S. N. 264,992, filed January 4, 1952. As therein shown and as illustrated in Fig. 14 of the drawings herein, it comprises a cylindrical container or vial A, preferably of glass, having one free large open end 70 and a second open end 72 terminating in a reduced neck portion with a radial annular flange or lip 74. A resilient stopper 76 is situated in the reduced neck portion and a second resilient plunger member 53 is situated in the other open end to seal the vial with an included medicament. A perforated metallic ferrule or closure cap D is positioned to overlie the end stopper and includes a terminal edge clamped in frictional fit relationship with the underside of the vial annular lip to positively seal the vial stopper therein and form a seating structure for receiving and retaining a dispensing needle assembly including a protective sheath.

The protected needle assembly is shown more particularly in Fig. 15 and includes a hollow hypodermic needle 875 supported in a stepped cylindrical holder 886 having an axially and rearwardly extending sheath or skirt 880. The flesh piercing end of the needle is covered by a removable sheath 890. The particular construction and purpose of the combined cartridge and needle assembly will be more readily appreciated from the more detailed description of the invention which follows.

The various operations performed by the machine of the invention and their sequence will be more readily understood by reference to the block diagram of Fig.

1. As shown in the figure, the machine performs an operation in which vials from dual supply hoppers are continuously supplied to parallel conveyor lines at a first station in which a plunger insertion operation takes place. As shown, the plunger stoppers which are to be inserted in the large open end of the vials are supplied in a predeterminedly oriented position from a common central source to each of the plunger insertion stations. Thereafter, the vials with the inserted plungers proceed along the conveyors to second stations at which a plunger inspection operation takes place and which operation serves to ascertain proper positioning of the plunger stopper in the vial and to eject those vials which are defective in this respect. Satisfactory vials then proceed to parallel filling stations wherein identical filling pumps supplied from a common reservoir operate to inject a predetermined amount of medicament into the plunger stoppered vials on the conveyors. Upon completion of the filling operation, the conveyor transports the filled vials to a stopper insertion station, which in each case, is independently fed with rubber-like resilient stoppers from independent sources having means for orienting the stoppers into a predetermined position for application to the filled vials. Subsequently, the stoppered vials proceed through a cap-positioning station wherein metallic ferrules or closure caps supplied from a common source to identical cap-applying mechanisms in an oriented condition are applied over the stoppers in the vials, the conveyor immediately transporting the cap-carrying vials to a cap-sealing station wherein identical spinner mechanisms operate to seal the cap and stopper into a hermetical sealing relationship with the vial. Thereafter, the sealed assemblies are transported through a cap inspection station which senses the presence or absence of the metallic closure cap and in turn selectively conditions immediately following needle insertion stations for the application of sterile needle assemblies to those vials which proceed thereto bearing a properly positioned sealing cap. As shown, each of the needle insertion stations is supplied from an independent source with sterile needle assemblies which are predeterminedly oriented for application over the cap-bearing ends of the vials. And finally, the completed assembled units are ejected from the dual conveyor lines by dual ejection mechanism.

The machine for performing these operations, as will be noted by reference to Figs. 2 and 2c inclusive, 5 and 10, includes a pair of endless chain-type conveyors 60, 60a which are positioned to traverse a continuous endless path between a drive sprocket and a spaced idler sprocket supported in a conventional manner (see Fig. 10). The chain links 135 of the conveyor carry spaced plate members mounting vial supporting blocks 65. These blocks are adapted to run upon a guide structure 190 during the upper and main run of the conveyor and upon a further guide structure 195 during the return run of the conveyor. Each of the vial supporting blocks includes movable sections which are adapted to be normally positioned in clamping relationship but which can be moved apart to receive or eject the vials therefrom. The respective conveyors are positioned to form a linear transportation path at each side of the machine between a vial hopper formed as tray-like cabinets 59, 59a (see Figs. 2 and 3) and a needle assembly insertion station 790 mounted directly beneath a needle applying mechanism 770 (see Fig. 2c).

The vial hoppers or tray-like cabinets 59, 59a are supported in parallel alignment from the main support unit 1000 and cooperate with identical star- or Geneva-type feed wheels 68, 68a to direct glass vials from the hoppers to gravity feed chutes 63, 63a in sequence with the large open end 70 of the vial facing up. The respective feed chutes 63, 63a transport the vials to vial transfer wheels 57, 57a at each plunger insertion station in position and readiness for the plunger insertion operation.

The plunger stoppers which are to be applied to the large open ends of the vials to form a hermetical seal therein are supplied in random orientation to a unitary storage hopper 1 (see Figs. 2 and 3) which serves to feed plunger stoppers to both assembly lines 60, 60a. Suitable mechanism is assembled with the hopper including a vertical rotating wheel 3 cooperating with a plunger transfer conveyor 5 for sequentially moving the plunger stoppers from the hopper to an orientation mechanism which includes a rotating horizontal or orientation wheel 19 for receiving the plunger stoppers transferred from hopper 1, via a vertical transfer wheel 9, and is provided with vertically directed pockets 21.

Assembled with the orientation wheel 19 is a plunger stopper position or orientation sensing mechanism including a pair of spaced plates 25 which serve in cooperation with an ejection mechanism 30 to direct plungers of predetermined orientation into a feed chute 31. Also assembled with orientation wheel 19 at a point 180° removed from unit 25 is a further plunger ejection mechanism 107, see Fig. 3, which serves to transfer the plunger stoppers which remain in wheel 19 to an inversion wheel 69 and ultimately to a second feed chute 31a in a position in which the plungers are oriented in like manner to those transferred to chute 31. As shown in Fig. 5, the plunger stoppers supplied through the chutes 31, 31a are subsequently transferred to identical horizontal positioning wheels 49, 49a at the respective plunger stopper inserting stations 40, 40a via a selective feed mechanism 33, 33a. The predeterminedly oriented plunger stoppers supplied to the positioning wheels are ultimately inserted into the glass vials supported by the transfer wheels 57, 57a by means of pneumatic applying devices 120, 120a.

After application of the plunger stoppers to the larger open end of the vials while in the transfer wheels, the vials are discharged to the article supporting blocks 65 on the respective conveyors 60, 60a in an inverted position in which the remaining open end 72 of the vial is exposed above the surface of the supporting blocks as more particularly shown in Fig. 9.

The conveyor is synchronized to move in a predetermined phase relationship with movement of the component parts of the machine, in a manner described in more detail hereinafter, and intermittently transports the plunger stoppered vials received from transfer wheels 57, 57a to subsequent filling and closing stations shown in Fig. 2a. Since the individual mechanisms associated with each conveyor line are identical, only one series of stations has been shown for line 60. As therein indicated, the vials are transported past an inspection mechanism 201 including a pneumatic motor unit 259 and an inspection finger 203. The inspection mechanism 201 is so constructed as to sequentially project the inspection finger 203 into the open end of the vial to sense the presence or absence of a properly positioned stopper 53 in the lower end of the vial and to remove those vials which lack a plunger by means of a pair of pivoted gripping elements 204, 205.

After inspection, the vials progress to the filling mechanism, generally indicated at 207, which meters and fills the vials with a measured amount of medicament. This is accomplished by means of a reciprocating type pump comprising a cylinder and piston unit 209, 211. The base of cylinder 211 is provided with a needle or discharge tube 213, which is adapted to project within vials 53 and successively fill them from the bottom up. To this end, cylinder 211 is reciprocated through a yoke 215 operated by a cam. An electrically actuated stop mechanism 240 is provided to prevent the downward travel of yoke 215 and cylinder 211 except when a vial is positioned immediately beneath the filling needle 213. This stop mechanism is actuated by a microswitch 223 having an arm 225 contacting each vial as it becomes properly positioned beneath needle 213.

The volume of material metered and dispensed by the filling mechanism is controlled by the relative movement between piston 209 and cylinder 211. The piston is adapted to reciprocate with the cylinder, but is limited to its downward travel by a pair of locknuts 227 and 228 which engage a stationary fork or stop mechanism 229 associated with the main support 1000. Locknuts 227 and 228 are adjustable to permit varying the capacity of the mechanism. The liquid medicament to be dispensed is fed to the device through a tube 213 from a suitable reservoir not shown. The operation of this device will be more fully described hereinafter.

After the filling operation is completed, the vials proceed in the conveyor blocks 65 to the closure stopper insertion mechanism generally indicated at 235, where they are stoppered with conventional rubber closure members. However, before stoppering can occur, the closure stoppers must first be properly oriented so that they can be fed to the stopper insertion mechanism in uni-directional alignment. The orientation mechanism is generally indicated at 237 and consists of a rotating hopper or drum 239 provided with a series of longitudinal scoops 241 about the inner periphery thereof, for picking up the stoppers and transferring them to the orientation chute 243. Although the details of this mechanism will be described more fully hereinafter, it is appropriate to note that it broadly comprises a chute 243, which is provided with a central channel for receiving the stoppers and a twist for the purpose of rejecting those stoppers which are not properly positioned within the channel. The top of chute 243 carries a shovel 245 which receives the stoppers S from the scoops 241 and directs them toward the channel within chute 243.

Those stoppers which are properly oriented are conveyed by gravity feed down inclined chute 243 to the stopper insertion mechanism 235. They are preferably assisted in this action by a vibrator 247 connected with the discharge end of chute 243. The closure stopper insertion mechanism has a housing 249 for receiving the stoppers and positioning them above a discharge hole which connects with the vials. This housing mounts a reciprocating plunger 253 which drives the stoppers into the vials. A spring 255 is provided for the purpose of normally urging plunger 253 upward. The plunger is urged downward for a stoppering operation by means of a pneumatically operated servomotor 256 having a reciprocating piston 257.

The plunger stopper inspection mechanism 201, filling mechanism 207 and closure stopper insertion mechanism 235 are all mechanically synchronized for intermittent operation with conveyor blocks 65 which undergo stepwise movement.

After completion of the stopper insertion operation, the conveyors transport the stoppered vials to subsequent closure cap positioning and applying stations. Since these stations are again identical for each conveyor 60, 60a, only the details of the stations associated with line 60 are illustrated in Fig. 2b. As therein shown, the cap positioning station comprises a positioning block 502 communicating with a feed chute 440 for supplying aluminum or other metallic ferrule-like closure caps from a storage hopper 435. Normally, the closure caps which have a generally cup-like configuration with a centrally located perforation for reception of the stopper-piercing end of the needle assembly, are introduced into the hopper 435 in random orientation and are thereafter sequentially fed through the chute mechanism 440 via a feeding device 429 in end-to-end alignment. In order to make certain that the closure caps which reach the applying block 502 are in proper physical relationship or orientation to be applied to the vials, an inspection and ejection or sorting mechanism 470 communicates with feed chute 440 and serves to eject those closure caps which are improperly oriented or which may be deformed or otherwise physically defective.

Since the aluminum ferrule elements comprising the closure caps of the present invention, although relatively fragile, are in effect self-sustaining and capable of withstanding some rigorous handling, a single storage hopper and feeding mechanism is utilized to supply both conveyor lines 60, 60a. For this purpose, the feed chute 440 includes a branch chute 440a immediately below the inspection-ejection mechanism 470 which is adapted to feed closure caps to an identical cap-applying station associated with conveyor line 60a (not illustrated). As will be readily understood from the more detailed description set forth hereinafter, the feed of closure caps through chute 440a is obtained by simple overflowing discharge when lower section of chute 440 is filled.

The cap positioning block 502 includes a vertically directed reciprocable plunger member 504 which is adapted to be selectively actuated by a pneumatic device 525 to move the closure caps from the block to an overlying vial. A cap applying mechanism including an actuator structure 545 operated by pneumatic device 540 is also associated with position block 502 for selectively directing closure caps from the lower end of chute 440 into the block 502 in position under the reciprocable rod 505.

After application of the closure caps to the stoppered ends of the vials, the conveyor transports the cap-bearing vials to a further sealing station 570, see Figs. 2b and 34, wherein a vertically reciprocable metal spinner unit 690 is adapted to move down over the metallic closure caps and into contact with the same to seal them about the annular neck of the vial and in cooperation with the resilient closure stopper 74 to form a fluid-tight seal. As shown in Fig. 34, the cap spinning mechanism includes a drive motor 572 operatively connected to a hollow spinner shaft 576 which in turn is connected to rotate the spinner unit 600 by means of a threaded coupling 578, 605. In accordance with the present invention, the spinner unit 600 includes three freely rotatable metal spinning discs or knobs 614, 616, 618 which are raised and lowered from contact with the cap covered vials by means of a rack or pinion mechanism 595, 593 actuated from a cam control structure shown more particularly in Fig. 35. It will be readily understood that the operation of the spinner mechanism takes place in synchronous movement of the conveyor 60, 60a and the other assembly stations.

After completion of the cap spinning operation, the closed and sealed vials are transported to a needle assembly insertion station 790, see Fig. 2c, which is adapted to be supplied with sterile covered needle assemblies N from a hopper mechanism 700 serving as a storage chamber and directing the covered needle assembly in predetermined alignment through a feed chute mechanism 725 and an inverter structure 740 to the positioning mechanism 790. The needles are received by the feed chute with the flesh piercing end oriented to hang vertically downwardly, as shown, and are sequentially fed through the inverter structure by gravity for subsequent ejection therefrom by a pneumatic device 760. Device 760 serves to systematically transfer the needle assembly from the feed chute to a needle positioning mechanism 790 with the stopper piercing end pointed downwardly (i. e., inverted). The needle positioning assembly has cooperatively associated therewith a second pneumatic device 770 which serves to force the covered needle assembly through the positioning structure 790 to the upper exposed end of a sealed and ferrule-bearing cartridge assembly supported in an underlying conveyor block 65.

In order to prevent inadvertent operation of the needle applying mechanism, a sensing unit 800 is positioned to overlie the path of movement of conveyor blocks 65 and includes a depending pair of spaced electrically conductive contact fingers 805 and 806 (not shown) for the purpose of riding against the metallic ferrule on the sealed cartridge as the conveyor moves the cartridge toward the needle positioning assembly 790. The sensing mechanism is in turn connected to a valve control system 850 which is adapted to selectively energize the servomotor mechanism 760 via a fluid conduit 852. The arrangement is such, as will hereinafter become apparent, that the servomotor will not be energized to move a covered needle from chute 725 through the inverting assembly 740 to the positioning assembly 790 in the absence of a metallic ferrule on the exposed end of the cartridges supported in the closure blocks 65. It will thus be apparent that should prior stations fail to operate properly, as for example, by omitting to seal the stoppered end of the cartridge with the metallic ferrule, the imperfect cartridge will pass through station 790 without having a covered needle applied thereto. At the same time, it will be obvious that should a prior station fail to apply a closure stopper to the exposed end of the vial, the metalic ferrule will not be sufficiently high enough to contact fingers 805, 806 (not shown) and again the imperfect vials will pass through station 790 without receiving a covered needle assembly. At the same time, warped, torn and generally defective ferrule elements will normally fail to close the circuit of sensing unit 800 to prevent application of a covered needle to the defective assembly.

After application of the needle assemblies N over the sealed ends of the cartridges A in each of the respective conveyor lines, the conveyors transport the finished units over the terminal drive sprockets of the conveyor mechanism, see sprocket 939 in Fig. 10, with an automatic inversion of the cartridge units to face vertically downward. With the finished cartridge units so positioned, each conveyor continues to move along the lower return run of its endless path to bring the cartridge units into position with an ejection mechanism 980, only one of which is illustrated in Fig. 12 of the drawings for the conveyor line 60. As will be more readily understood hereinafter, the ejection mechanisms operate to open the supporting block sections 160, 165 of the conveyors to gravity discharge the finished cartridge to an underlying delivery chute or similar structure for final packaging in cellophane wrappers or paper cartons, or the like packages.

One of the unique features of the invention resides in the provision of a control path for the cartridge unit which facilitates location of the various assembling mechanisms in an upright central position, giving ready access for repairs or replacement purposes, and also inherently facilitates a rapid removal of the finished units from the machine with a minimum of equipment and energy.

The operation and manifest advantage of this arrangement will be better understood, however, after reference to the following detailed description of the machine.

*Details of the plunger stopper hoppering and orienting mechanism*

As previously pointed out, the end of hopper 1 is provided with a rotating wheel 3 about which a chain conveyor 5 is revolved for the purpose of picking up the plunger stoppers from within the hopper. This is accomplished in part, as shown most clearly in Fig. 3, by providing wheel 3 with an annular rim 81 having a series of radial passages 83 therethrough which traverse a circular path parallel with that of the chain conveyor. Chain conveyor 5 consists of a series of small blocks 85 provided with pockets 89 and linked by conventional chain linkages 87, for the purpose of receiving plungers which drop through the passages 83 and into the pockets of blocks 85 as wheel 3 traverses the base of the hopper. To facilitate this action, the plunger stoppers are agitated within the hopper by means of rods or fingers 2 attached to oscillating and reciprocating ring 93 supported by a rocker arm 12. Rocker arm 12 is in turn pivotally connected at 20a to a bracket 22 pivotally connected at 20 to a cross bar 6 fixedly carried by the cover of chain 5. Bar 6 includes a depending arm 6a to which one end of a biasing spring 8a is attached, the other end of the spring being connected to the rocker arm 12. The rocker arm further includes a laterally projecting shoulder or cam 12a which is adapted to bear against the slide on arm 6a. In addition, rocker arm 12 includes a slot 13a at its upper end for slidably receiving a pin carried by a slide block 13 fixedly carried on actuator rod 913.

The arrangement is such that reciprocating of rod 913 will move the upper end of rocker arm 12 about pivot 20 to oscillate ring 93. At the same time, the action and relative positions of spring 8a and cam 122 impart an axially translating movement to the rocker arm and fingers 2. This causes the fingers to project into the holes 83 in rim 81 and eject the plunger stoppers. The plungers thus progress from the base of the hopper 1 through rim 81 of wheel 3 to the pockets in the conveyor 5 and about idler 7, until ejected from the conveyor by the reciprocating rod 913 and forced into the pockets 11 of vertical transfer wheel 9, as shown more particularly in Fig. 4. The plunger transfer rod 913 is advantageously provided with a pair of inter-connected, spring loaded feelers 97, which insure proper alignment of the plungers for insertion into wheel 9. The feelers are normally retained in a retracted position by spring 98. Rod 913 is mechanically actuated, as hereinafter more particularly described, but pneumatic or electrical means may also be employed for this purpose.

As previously pointed out, each of the pockets 11 within wheel 9 is provided with a loosely fitting piston 17, see Fig. 4, having a pin 16 projecting through slots 18 (Fig. 3) in the face of the wheel. This construction facilitates removal of the plunger stoppers from the pockets 11 in which they are snugly contained. Such removal takes place after wheel 9 has rotated 90° from the point of plunger stopper insertion therein and it is accomplished by means of a pneumatically operated plunger 14 action upon pin 16 and forcing the plunger stoppers from their pockets into the corresponding pockets of orientation wheel 19.

While the orientation wheel is partially shown in Figs. 2, 3 and 5, its construction and that of the sorting mechanism are better shown in Figs. 6, 7 and 8. In the plan view of Fig. 6 the orientation wheel is rotated clockwise in a step by step manner reciprocating pawl 103 engaging tooth-like indentations 101 in its outer periphery of the wheel. Rotation of the wheel moves the plunger stoppers between the horizontal blades 25. A stationary bearing plate 23 is preferably provided beneath wheel 19 to retain the stoppers in the wheel. Blades 25 are rigidly attached with respect to plate 23 and support 1000 above which wheel 19 rotates, by means of legs 34 between the outer blade and plate 23. A pair of spacer bars 36 connect the blades to each other. The blades are maintained in contact with the upper face of wheel 19 and are preferably bevelled as shown at 32 to facilitate retention of all plunger stoppers which contact them in the position illustrated by Fig. 8. More specifically, the plungers which are positioned as in Fig. 7 are not so retained and drop through tube 31, whereas those positioned as in Fig. 8 are retained by blades 25 and continue to move with orientation wheel 19 to a position opposite the sorting blades and above inversion wheel 69.

It will be recalled that the plungers which are positioned with the studs pointed down with the pockets of orientation wheel 19 have all passed the sorting blades 25 and are transported to the side of the machine shown in Fig. 8. Such plungers are removed from orientation wheel 19 by means of a knockout pin or rod 77 carried by yoke 75 and introduced into the pockets 71 of inversion wheel 69 at the top thereof. As pointed out, a second pin 79 (shown best in Fig. 5) which removes them from these pockets after they have been inverted to the proper position, is also fixedly attached to the yoke 75. The entire yoke is slidably supported on support 1000 and is reciprocated by a common actuating means such as a pneumatically operated servo-motor 107 carried by the common support 1000. Springs 78 are provided to return the yoke and knockout pins to a retracted condition while orientation wheel 19 and inversion wheel 69 are in rotation. Rotation of inversion wheel 69 is obtained by means of gearing 62 connected between a shaft 56 extending from the inversion wheel and a shaft 58 which rotatably journals wheel 19 in the support 1000. The arrangement is such that movement of wheel 19 via pawl 103 turns wheel 69 in synchronized relationship through gearing 62. The plunger stoppers ejected from inversion wheel 69 by plunger 79 are delivered to a vertical chute 31a from which they proceed to a plunger stopper insertion mechanism, for conveyor line 60a (see Figs. 3 and 5) which is identical to that for line 60 (see Figs. 2, 5 and 9).

*Details of the plunger stopper insertion mechanism*

Since the mechanisms for each of the conveyor lines are identical from this point, particular reference will be made only to the structure shown in Figs. 2, 5 and 9. As described previously, the oriented plungers proceed in chute 31, passing the overflow unit 37, 43 (Fig. 2) to an ejection mechanism 33 at the base of the chute wherein they are retained by restriction 35. As can be seen by reference to Fig. 9, tube 31 terminates above restriction 35 in an offset arm 46 which is internally connected to the latter. An elongated bent strip or arm 38 depends from a sub-support 50 and with arm 46 form slot-like access openings adjacent the fingers 45. The plungers are individually ejected from restriction 35 by reason of the spring fingers 45 and projecting between arms 38 and operating against the lowermost plunger in the device. The spring fingers are attached to a yoke 111 which reciprocates on chute 31 and is stabilized by support 50. The yoke is actuated by a reciprocating plunger 112 through a pneumatic servo-motor 113 connected to move a second yoke 115 against the yoke 111. The spring fingers 45 are returned to a static position by means of a spring 44 positioned above arm 46 and operating against yoke 111. Movement of pneumatic cylinder 113 and fingers 45 is synchronized with the intermittent rotation of the plunger positioning wheel 49 to facilitate insertion of the plunger stoppers into the pockets 47 of the positioning wheel. The plunger stoppers are then rotated to a position beneath the insertion plunger 51 of servo-motor 120. The plunger 51 has a central recessed aperture (not illustrated) to receive the studs of the plunger stoppers and steady them as they are forced from the wheel 49 into the vials contained in wheel 57. Plunger 51 and motor 120 are supported by brackets 52 on main support 1000 and are operated in synchronization with wheel 49 through control of the actuating motor 120 in a manner more fully described hereinafter.

*Details of the vial feeding and transferring mechanism*

The glass vials into which the plunger stoppers are inserted are supplied to the transfer or vial wheel 57 from a simplified storage arrangement which facilitates rapid replenishment and promotes sterile conditions. As heretofore explained, the machine of the invention employs dual assembly lines and it has been found most desirable to incorporate a separate storage and feeding arrangement for supplying glass vials to the respective lines. This arrangement will be more readily understood by reference to Figs. 1, 2, 3 and 9 of the drawings in which the vial supply units are illustrated as comprising dual box or tray-like cabinets 59, 59a of identical rectangular form and vertically mounted on the main support unit 1000 by conventional bracket members. In a preferred form of the invention, the cabinets 59, 59a are made of stainless steel and are provided with an integral depending housing 61, 61a at one corner, which housing is in open communication with the interior of the cabinet. The cabinets are adapted to support a plurality of glass vials A, as shown in Fig. 9, in stacked array with each vial being oriented to have its large open end directed outwardly towards a removable cover member 58, 58a. With this arrangement, as will be more readily understood by reference to Fig. 9, the vials are automatically gravity fed towards the lower corner and housing 61, assisted by a plurality of spaced guide vanes 56, where the vials are individually received in pockets 66 of a star or Geneva transfer wheel 68. Wheel 68 is in turn actuated in a step-by-step manner to sequentially move the vials to a position opposite a feed chute 63, at which point, the vials discharge through an opening (not illustrated) in the housing 61. The vials are received in the chute 63 with the large open end pointed away from wheel 57, and move down the chute into radial pockets 55 in the outer periphery of the vial wheel.

The face of the vial transfer wheel 57 is provided with an annular depression 121 near the base of pockets 55 to expose a portion of each pocket or passage through holes 123, as shown in the figure. The purpose of this construction is to permit cushioning of the glass vials as they leave the vial feed chute 63 and enter pockets 55 to minimize breakage of the vials. For this purpose, chute 63 is provided with an extension 125 having radially inwardly projecting resilient tip member 127, partially extending within the radial passages 55 through the holes 123. The vials which leave chute 63 thus engage projection 127 before hitting the base of each passage, and under normal conditions of use will be cushioned and prevented from breaking.

However, a limited amount of breakage may nevertheless be encountered due to defective vials which may proceed undetected to the vial wheel 57. For this reason a series of holes 129 are connected via passageways 53 with the base of each pocket 55. A jet of compressed air is adapted to be delivered through holes 129, passageways 53 to the pockets from a stationary air-head 131 as rotation of wheel 57 moves each hole 129 into registry with the head. The head 131 is supported by a conduit 133 carried in a clamp unit 134. Any broken glass which would not normally fall from pockets 55 as each pocket leaves guide 67 is thus removed by a jet of compressed air directed to the base of the pockets after a few more degrees of rotation. The air supplied through conduit 133 to head 131 is controlled by a normally closed valve 963 actuated by an arm 962 in synchronism with movements of the vial wheel.

The vials received by the vial wheel are moved to a position directly beneath plunger rod 51 where the plunger stoppers are then inserted from horizontal positioning wheel 49. Movement of wheel 49 is synchronized with movement of vial wheel 57 through a common drive shaft 141 and gearing 142 as shown in Figs. 5 and 37. Shaft 141 is intermittently rotated by means of a ratchet wheel 953 and driving pawl 955 as more fully explained hereinafter. As indicated above, the vials are retained in the rotating vial wheel after insertion of the plunger stoppers by means of an arcuate guard member 67 extending about a portion of wheel 57. Since the plunger stoppers are inserted into the large open end or base of each vial, the vials are inverted by rotation of wheel 57, before being delivered to conveyor blocks 65 to present a smaller flanged end in exposed position, as shown in Fig. 9, in readiness for further operations such as filling and closing at remote stations (not illustrated). Preferably, a stabilizing guide member 64 is carried by the casing 40 for assisting transfer of the vials from wheel 57 to the conveyor blocks 65.

*Details of the conveyor mechanism*

Receipt of the vials from wheel 57 after insertion of the plunger stoppers is facilitated by the particular construction of the conveyor mechanism as illustrated in Figs. 10 to 12 inclusive of the drawings. As will be noted by reference to Fig. 10, the conveyor 60 comprises an endless chain 135 positioned to traverse a continuous path about a drive sprocket 939 and a spaced idler sprocket 941, the sprockets being supported in a conventional manner, not illustrated. The chain links 135 carry spaced plate members on which are mounted the vial supporting clamping blocks 65. A guide structure 190 is provided for the upper and main run of the conveyor while a further guide structure 195 is provided for the return run of the conveyor. The particular construction of the guide structures will be appreciated from an examination of Figs. 9 and 12 of the drawings in which the guideway 190 is shown as comprising a pair of spaced walls 192 supported on a plate 191 for the purpose of eliminating any sway in the line of blocks 65, and the guideway 195 is shown as comprising a pair of spaced runners providing a drop-out opening 196 centrally of the line of blocks. It will be understood that an identical structure is provided for conveyor line 60a.

As shown in Fig. 11, each clamp block 65 is formed of two mating and relatively movable sections 160, 165, the section 160 being fixedly connected with the supporting plate 69 on chain linkage 135. On the other hand, the section 165 is movably mounted on the support plate by means of a pair of bolt members 161 which project through counter-bored openings in section 160 to a crossbar member 170 slidably retained in a groove 168 in the side of section 160. Sleeve members 162 are mounted on the bolt members to facilitate easy relative movement between the sections. Normally, sections 160, 165 are maintained in close, clamping relationship by means of springs 164 which bear against the bar 170 and urge section 165 toward contact with section 160. Each section is also recessed as at 137 to provide a pocket for receiving and supporting a vial in an upstanding position, the upper edges of the pocket being beveled as shown to assist reception of the vial therein.

The mechanism for opening the blocks 65 as they register with the lowermost opening in vial wheel 57 is best illustrated in Fig. 5 of the drawing and comprises a reciprocable rod 139, 139a mounted for movement towards and away from the blocks in housing 40, 40a. A spring 148, 148a is positioned between housing 40 and a headed end on the rod to normally retain the rod in a retracted position.

Movement of rod 139, 139a to open the blocks for receiving the vials from the vial wheel is controlled by a crank like follower arm 147, 147a projecting in proximity with control shaft 925, 925a and pivotally mounted on housing 40 as at 146, 146a. With this arrangement a rocking of the follower arm 147 in clockwise direction, as viewed in Fig. 5, will press rod 139 against bar 170 to separate block sections 160, 165 for receiving a vial as it drops from wheel 57. As heretofore indicated the opening of the blocks is synchronized with the movement of the conveyor and vial wheel 57 in a predetermined manner through the common control shafts 925, 925a.

*The drive and control mechanism for the plunger stopper feed unit*

The plunger stopper feeding structures are adapted to be independently operated by a self-contained drive and control unit which is more fully illustrated in Figs. 3 and 13 of the drawings. Fig. 13 shows in graphic relationship the upper portion of the machine including those mechanisms associated with the feeding of the plunger stoppers from the main supply hopper 1. Referring to Fig. 13, 901 is a motor linked through a belt drive to an actuator shaft carrying cams 903 and a crank plate 905. Crank 905 is in turn linked through connecting rod 907 and arms 906, 908 to three rods, 913, 909 and 911, for the purpose of imparting reciprocating motion thereto. It will be recalled that rod 913 is employed to impart stepwise rotation to wheel 3 within plunger stopper hopper 1 for the purposes previously described, and to arm 12 and pawl 8 linking rod 913 to wheel 3, as shown in Fig. 3. It will also be recalled that the end of rod 913 is employed to eject plunger stoppers from chain conveyor 5 and transfer them into the radial pockets of vertical transfer wheel 9. Reciprocating rod 909 is connected to move arm 10 carrying pawl 10a by a collar 910 (see Fig. 2) for the purpose of imparting stepwise rotation to vertical transfer wheel 9. Finally, rod 911, through linkages 915, 917 imparts motion to pawl 103 to provide stepwise rotation of horizontal orientation wheel 19.

The pneumatic, servo-motor control and drive mechanisms associated with the previously described elements are operated from the cam mechanism 903 driven by motor 901. This cam mechanism actuates two valves, 919 and 921 through pivoted arms 26, 28 (see Fig. 3). The valves deliver compressed air from a main source of supply 923 to the pneumatic cylinders which actuate the various plungers previously described. Valve 919 delivers air to pneumatic cylinders 15, 30 and 107. Cylinder 15 actuates plunger 14 which ejects plungers from vertical transfer wheel 9; cylinder 30 actuates plunger 29 cooperating with blades 25 above horizontal orientation wheel 19; and cylinder 107 actuates yoke 75 which ejects plungers from both horizontal orientation wheel 19 and vertical inversion wheel 69. Valve 921 delivers air to pneumatic cylinders 42 and 42a, which in turn actuate plungers 41 and 41a, respectively, controlling the ejection of over-flow stoppers within chutes 31 and 31a into receptacles 43, 43a (see Figs. 2, 3 and 5).

*Details of the plunger stopper inspection mechanism*

The plunger stopper inspection device of Fig. 2a is shown in greater detail by the sectional view of Fig. 16. As indicated above, this device is actuated by a pneumatically operated plunger which effects periodic reciprocation of the inspection mechanism each time a vial is positioned therebeneath. The pneumatic mechanism comprises a cylinder 259 provided with closure caps 261 and 263 at the top and bottom thereof, respectively. Cap 261 contains a passage 265 for receiving compressed air, while cap 263 is provided with a similar passage 266 for receiving a central plunger actuator or piston rod 267. The top of rod 267 carries a piston 269 which impels rod 267 downward under the force of the compressed air. Piston 269 and rod 267 are returned after each stroke to the position shown, by spring 271 operating against the base of the piston.

The end of plunger 267 carries an extension 273, which in turn carries the inspection mechanism proper. As previously explained the heart of this inspection mechanism centers around a pair of pivoted jaws or gates 204 and 205 which engage the throat of each vial lacking a plunger stopper in its base and remove the same from the vial-supporting blocks 65. The jaws are pivotally carried on pins 272, 274 by a body 275, slidably disposed with respect to extension 273 through a sleeve 277 retained about extension 273 by a collar 279. The inspection finger 203 is, of course, carried by body 275 for the purpose of detecting the presence or absence of a plunger stopper in each vial, and is fixedly positioned, as by splines, peening, or the like, in the end of a cavity 278 forming a passage for receiving the end of rod extension 273.

A pair of trip pins 281 and 282 are disposed in a fixed position on a support 200 which also supports cylinder 259. The trip pins cooperate with the pivoted jaws for the purpose of ejecting from the inspection mechanism those vials which are picked up by the jaws and removed from the blocks 65. Jaws 204, 205 are normally retained in a horizontal position by means of springs 283 and 284 situated within body 275.

The operation of the inspection device will be understood as follows. From the above description it will be apparent that Fig. 16 shows the inspection device in a state of rest. At such time as a block 65 carrying a vial A becomes situated directly beneath the device, a valve, not shown, delivers compressed air to the cylinder to reciprocate piston 269, thereby advancing rod 267, extension 273, and the entire body of the device downwardly toward the vial. This movement continues until finger 203 engages the top of the plunger stopper 53 within the vial, arresting the downward travel of body 275, as well as jaws 204 and 205. The length of finger 203 is so chosen with respect to the dimensions of the vial and the desired position of the plunger stopper therein, that jaws 204, 205 will be prevented from engaging the throat of the vial as long as a plunger stopper is present and properly situated within the vial. In those instances where the plunger stopper may be absent or only partially inserted within the base of the vial, the body 275 continues to move downwardly and the jaws will trip over the flange of the vial, engage the throat, and upon elevation of piston 269 withdraw the vial from the blocks 65.

Continued elevation of piston 269, which of course carries body 275 therewith, results in the engagement of trip pins 281 and 283 by the outer portions of jaws 204 and 205, respectively. This causes the jaws to pivot upwardly and recede from the vial, permitting the vial to drop from the device to the conveyor therebelow where the rejected vials may be retrieved by an operator or a suitable conduit. Sleeve 277 is slidably disposed about extension 273 to permit body 275 and the jaws connected thereto to be arrested in their downward travel, without interfering with the stroke of the pneumatic actuating mechanism 259, 269.

Details of the vial filling mechanism

Further details on the filling and associated control mechanism are shown in Figs. 17 and 18. As therein illustrated, the filling mechanism consists essentially of a reciprocating piston and cylinder unit 209, 211 which meters and delivers a measured amount of medicament to the vials through a needle 213. The piston is formed as an elongated rod-like member 209 having a series of lubrication rings 285 in its outer periphery to insure an effective seal and to facilitate relative movement between the two components. Piston 209 is further provided with a central passage 287 extending therethrough for the purpose of receiving liquid medicament from a reservoir (not illustrated) and delivering the same to the base of the piston. Normally, the inner end of the piston rod rests on the shoulder of a threaded coupling member 299 connected to the cylinder 211.

At its inner end, the piston is counterbored to receive a check valve consisting of a rubber diaphragm 289 and a spring 291 normally urging the diaphragm upward to obstruct passage 287. The valve is retained on the piston by a small axially extending collar 293.

Beneath this check valve a second rubber diaphragm 295 and a second spring 297 are provided to form another check valve for the purpose of retaining medicament in the pump while the pump is being filled. The lower valve is positioned in a compartment 294 formed by two threaded coupling members 299 and 301 which have central passages 303 and 305 therethrough for passage of the medicament. The passageway 305 in cooperation with valve 293 in compartment 290 and valve 295 in compartment 294 forms a miniature reservoir for the medicament which is normally retained in a filled condition. This effectively eliminates surges and irregular flow. Filling needle 213 is provided with a threaded hub 307 for attaching needle 213 rigidly to coupling 301.

Both cylinder 211 and piston 209 are reciprocated by a cam 217 carried on a control shaft 925 and a spring 219 operating against the yoke 215 which is rigidly secured to the cylinder. For this purpose the yoke includes a pair of vertically spaced bars 216, 218 which move up and down on guide rods, only one of which is illustrated at 220 in the figure. The guide rods 220 are in turn supported from a portion of the main support 1000 which also carries the fixedly positioned stop fork 229.

As previously explained, the downward travel of piston 209 is controlled by adjustable locknuts 227 and 228 on a threaded extension 210 and which engage the stationary fork 229 and arrest further movement of the piston on the down stroke. These locknuts can be adjusted to achieve a fine degree of control in medicament measurement, the volume of medicament being increased by lowering the locknuts with respect to piston 209 and decreased by raising them. Upward travel of piston 209 is limited by spring 233 carried and retained between a fixed collar 309 and a slidable sleeve 231. The arrangement is such that the strength of spring 233 is sufficient to overcome the frictional resistance of piston 209 in cylinder 211 during the filling operation to be described more fully hereinafter.

The pump is normally prevented from functioning by a blocking mechanism 240 until such time as a vial is positioned beneath needle 213 for a filling operation. The electrical control system which withdraws pin 221 and thereby permits the pump to function is shown in greater detail in Fig. 18. As illustrated, the mechanism 240 comprises a conventional electric solenoid unit 226 which is supported on a bracket 230, forming part of the main support 1000, and is directly connected to the blocking pin 221. The pin, in turn, is reciprocably mounted in a guide block 232 on the bracket 230 and is normally urged to an extended position in which it projects beneath the pump yoke 215 by a spring 236 positioned between the coil form of the solenoid and a collar 238 on the movable core.

Solenoid 226 is connected in a series circuit with any conventional source of electrical energy 310 and the micro-switch unit 223 carrying the vial engaging finger 225. The unit 223 is normally in a circuit-deenergizing condition whereby spring 236 urges pin 221 under yoke 215 (see Fig. 17), but can be actuated to a circuit closing condition by movement of finger 225.

Thus, it can readily be seen that as vial A engages arm 225, the contacts of micro-switch 223 will become closed, energizing the solenoid 226, and withdrawing pin 221 from beneath yoke 215. This permits the yoke to move down with the pump to perform a filling operation. As long as vial A continues in engagement with arm 225, solenoid 236 will remain energized and pin 221 will remain in the withdrawn position as shown. Upon removal of vial A, arm 225 will break the micro-switch contacts and de-energize the solenoid, permitting spring 236 to return pin 221 beneath yoke 215.

Details of the closure stopper feed and orientation mechanism

After filling, the vials proceed to the closure stopper insertion mechanism wherein they are stoppered with a small resilient stopper having a central plug portion and a flange which abuts the flanged neck on the vial. Before stoppering can take place, however, the closure stoppers must be oriented in unidirectional alignment from a random condition in a supply hopper for feeding to the stopper insertion mechanism. This is accomplished by the orientation mechanism of Fig. 2a, wherein 239 is a supply hopper provided with a series of scoops 241 adapted to pick up and rotate the stoppers, tumbling them into the upper portion of the hopper. One end of the hopper is provided with a flange 317 which rides in a grooved wheel 319 while the other end rests on a rubber lined motor driven wheel unit 321 (only one of which is illustrated) which rotates the hopper by means of a motor 323.

An orientation chute 243 extends within hopper 239 to receive the tumbled stoppers, orient them, and convey them to the stopper insertion mechanism 235 at the lower end of the feed chute. As shown more clearly in Figs. 21 and 20 the central portion of this chute is provided with a channel 325 of a depth and width sufficient to receive the plug portion of the stoppers, while permitting the flange portion to ride on the upper face of the chute as indicated at 326 in Fig. 20. A shovel 245 on the upper end of this chute receives the tumbled stoppers and directs them into channel 325. Since not all of the stoppers will be correctly positioned in channel 325 by shovel 245, a portion of the chute within hopper 239 is provided with a twist or bend, as shown as 328, 330. The angle of this twist may vary from 5 to 40°, depending upon the dimensions of the stoppers and the center of gravity thereof. In general, however, the angle is such that the center of gravity of improperly positioned stoppers provides a sufficient force-couple to cause such stoppers to move laterally under gravity to be rejected and tumbled back into the hopper, whereas those that are oriented as desired will remain in channel 325. A semicircular shield 327 is carried by chute 243 to retain the stoppers within the hopper as the latter is rotated.

In order in insure against possible overlapping of stoppers within channel 325 a reciprocating rod 329 is carried by the chute on brackets 332, 334 for the purpose of agitating the column of stoppers before leaving the confines of the hopper. For this purpose rod 329 extends through a hole in shield 327 and connects with a pivoted link 331, operating a wiper 333 which sweeps over the surface of the oriented stoppers. The wiper is a V-shaped structure pivoted at one side of the upper surface of chute 243 and to link 331. The wiper arrangement is best shown in the plan view of Fig. 20.

Rod 329 runs the length of the feed chute and is synchronized with the stopper insertion mechanism for reciprocation each time a stopper is inserted in a vial. For this purpose the end of rod 329 is pivotally connected with one arm of a bell crank 336 mounted for rocking movement in a vertical plane on bracket 338 supported near the end of the feed chute. The other arm of the bell crank is connected by a pin and slot arrangement 340 to the reciprocating plunger 253 of the insertion mechanism. The arrangement is such that movement of plunger 253 will rock bell crank 336 and reciprocate rod 329. To assist returning the rod to its initial position and to relieve the stress on spring 255 of the insertion mechanism, a second spring 342 is positioned over the rod between guide bracket 334 and a fixedly carried collar 344.

Outside hopper 239 the chute is provided with a cover 335 which retains and protects the oriented stoppers during their travel to the insertion mechanism. This travel is assisted by the vibrator unit 247 which contacts the chute at its lower, discharge end and continuously jiggles the same. Rod 329 is mounted above this cover on the support and guide brackets. The chute 243 is supported midway of its descent by means of a stationary resilient support structure 370. This structure includes a stationary standard or bracket 372 which is fixedly connected to the main support and which in turn carries a chute supporting unit 380. The unit 380 is shown fragmentarily in Fig. 19 and comprises an elongated trackway 382 having raised sidewalls 384 for the purpose of firmly and fixedly receiving the feed chute 243 therein. The trackway is in turn resiliently supported from the bracket 372 by means of three spaced cushion units 374, 376 and 378. As shown in Fig. 19, each such unit includes a rubber or other resilient materal grommet 386 permanently bonded to a thin metallic boundary strip 388. The strip 388 is fixedly connected at longitudinally spaced ends to the trackway 382 by means of threaded clamping studs 390, 392. The grommet, in turn, is connected to the bracket 372 by a bolt 390 carried by the bracket and projecting through a central bore 394 in the grommet. The grommet is locked to the bolt by means of a nut 396. A series of cavities 398 are formed in the bracket and in the trackway to eliminate any metal to metal contact and to accommodate lateral sway in chute 243.

This arrangement effectively reduces noise and implements obtaining a constant amplitude of vibration for the feed chute whereby feeding surges and the like difficulties are obviated. A particular feature of this resilient support arrangement is the isolation or dampening of unwanted vibrations of varying magnitudes which are present due to the intermittent operation of the other components of the machine. It is thus possible to mount all of the operating components on a single support 1000 of simplified and inexpensive design.

*Details of the stopper insertion mechanism*

The base of the chute is provided with a curve to introduce the stoppers into the stopper insertion mechanism 235 in position for insertion into a filled vial. This mechanism, shown in detail in Figs. 22 to 23b inclusive, consists of a housing 249 which is provided with a passageway 341 supporting a sleeve 251 through the central portion thereof for receiving a stopper insertion plunger 253. A spring 255 positioned about sleeve 251 and plunger 253 and operating against a head 254 on the plunger provides a return for the plunger after advancement of the plunger for an insertion operation. The head 254 carries a pivot pin 339 which is adapted to connect through the slot 340 on bell crank 336 to reciprocate rod 329 on the chute. The passageway 341 traverses through the housing and terminates in a reduced diameter chamber 346 in which is situated an extension 250 of rod 253. The rod extension includes a rounded plunger stopper engaging nose 252 and loosely carries a centering collar or sleeve 347. The collar or sleeve 347 is normally urged downwardly on the rod extension into contact with an abutment flange, as shown in Fig. 22, by means of a spring 349.

Chamber 346 includes an exit or punch-out opening 348 and a pair of opposed longitudinal recesses 350, 352 presenting support shoulders for receiving the stopper flange and seating the stopper in the proper position over the exit 348 as shown in Fig. 23. It will be understood that the housing 249 includes a slot in bottom front face, as shown at 256 in Fig. 22, for detachably receiving the discharge end of feed chute 243 so as to position its exit in direct alignment with chamber 346 and the stopper supporting shoulders 350, 352. The housing includes a further slot in the bottom face, as at 358 in Fig. 22, providing visual inspection of and access to the punch out opening 348 to facilitate the removal of deformed or jammed stoppers. As shown in Fig. 2b, the insertion plunger 253 is operated by a pneumatically energized servomotor 256 having a plunger 257 which strikes the head 254 on plunger 253 each time a stopper is to be inserted in a vial. It will be understood as previously indicated that operation of plunger 253 also causes reciprocation of rod 329.

The structure and operation of the stopper insertion mechanism is more particularly shown in Figs. 23 to 23b inclusive wherein three stages of operation are illustrated. As shown in Fig. 23, chute 243 delivers the stoppers to chamber 346 in housing 249 in position above the punch-out hole 348 connecting with the vials as shown, the diameter of the stopper flange being slightly larger than the diameter of the hole. This stage shows the insertion plunger with a stopper in the static position, immediately before the insertion stroke. Upon actuation of plunger 253, stopper 355 which includes a central needle retaining groove or chamber 353 is engaged by the nose projection 252 and on the lower extension rod 250. This drives the stopper through the opening 348 and into the vial A. As the nose portion 252 enters the recess 353 of the stopper, the spring pressed sleeve or collar 347 contacts the stopper flange and serves to keep the stopper centered as nose 252 pushes it out opening 348. As the stopper enters to vial A (see Fig. 23a) the spring remains compressed placing an even pressure about the perimeter of the sealing flange. It will be appreciated that this action serves to reduce any canting or skewing of the stopper and makes the stoppering operation substantially fool-proof. Upon release of the pressure upon plunger 253, spring 255, shown in Fig. 22, elevates plunger 253 while spring 349 retains sleeve 347 in contact with the stopper. This effectively strips the stopper from the plunger as shown in Fig. 23b while preventing loss of the seal.

From the above description, it will be understood that the plunger stoppered vials which are transferred from the respective transfer wheels 57, 57a to the respective conveyors 60, 60a (see Figs. 5 and 9) are then progressively transported along a linear path by the conveyors at each side of the machine. The progression of the plunger stopper bearing vials is intermittent due to the nature of the driving mechanism connected with the respective conveyors, as will be more readily understood hereinafter, and is so synchronized with the components of the machine shown in Fig. 2a as to provide predetermined dwell periods beneath stations 201, 207 and 235 cooperating with conveyor 60 and identical stations (not illustrated) cooperating with the duplicate conveyor 60a. After completion of the closure stopper insertion operation at station 235 (Fig. 2a), the conveyors continue to move the stoppered vials to succeeding stations illustrated in Fig. 2b for completion of the sealing operation in which metallic closure ferrules are applied and physically sealed over the stoppered ends of the cartridge vials.

*Details of the closure cap hoppering and feeding mechanism*

As shown in Figs. 2b and 24, the mechanism for supplying and applying the closure caps or ferrules to the glass vials includes a stationary elevated support structure including a table surface 402 upon which is mounted a motor 403 connected to operate a cap feeding unit 420 carried in an upstanding support structure 414. The support structure 414 may be of any desired form but preferably includes an annular recess 416 and a pair of opposed guideways 419, only one of which is illustrated in Fig. 2b for a purpose hereinafter apparent. The annular recess 416 extends transversely of the support structure and is so constructed as to receive a stationary annulus structure 420 (see Fig. 24) comprising a circular end plate 421 having a central opening receiving the bearing member 413 for rotatably supporting a driven shaft 410 therein. A pair of annular members 422 and 423 are connected to end plate 421 to provide a recessed area into which a rotatable metallic ferrule feeding structure 425 may be inserted. The motor 403 operates a drive shaft carrying a spring urged, overload-releasing coupling element 407 (Fig. 2b) which is adapted to engage a second coupling element 409 on shaft 410 (see Fig. 24).

The feeding structure includes a second plate member 426 in the form of a disc or the like which is fixedly connected with the inner end of shaft 410 and which carries an annulus 428 by means of spacer members 427 on securing bolts 429. The annulus or ring member is chamfered on its inner leading edge as at 430 and the rotatable plate member 426 includes radially spaced axially directed pins or pegs 431 for a purpose hereinafter explained. It is preferred that the pins 431 and the spacer members 427 are so radially positioned with respect to each other in cooperation with the spacing between ring member 428 and plate 426 that the end closure members adapted to be used with the mechanism may readily fit between the pins during movement radially outwardly from the center of the mechanism into contact wtih adjacent spacer members 427 which are so positioned that only one end closure cap may pass therebetween at a time.

The annular structure 420 as previously indicated, is adapted to seat within support 414 carried on the table 402 in such manner as to position an outlet passageway 443 in annular ring 423 in a vertical direction in registry with a feed chute 440. The passageway 443 lies radially outwardly of the spacer members 427 and in cooperation with the inner wall of ring member 428 form a drop out opening permitting the closure caps to pass from between plate 426 and ring 428 to the feed chute 440.

In order to continuously supply the closure caps through the separating wheel 425, a stationary storage hopper or bin assembly 435 is provided with a guide plate 437 which is adapted to be interchangeably received within the guideways 419 of member 414. The hopper is in general formed as a semi-frustro conical chamber 438 having a second differently dimensioned semi-frustro conical compartment 439 mating therewith, the forward ends of the respective semi-frustro conical sections terminating in an annular outlet mouth 436 of a size registering with the axially outer but radially inner edge of ring 428. The hopper is provided with a pivoted lid 432 for the purpose of receiving a supply of closure caps into the chamber 438.

The hopper assembly with its attached guide plate is preferably formed of a rust and contamination resistant material, as for example, stainless steel, and may readily be disconnected from cooperative relationship with the separating wall structure 425 for purposes of sterilization. To implement removal of the same from seating engagement in the stationary guideways 419, the guide plate 437 is provided with a finger lift bar 434. It is also usually preferred to construct the separator wheel from non-corrosive, contamination resistant materials, such as stainless steel or tantalum, while the spacer members 427 are preferably of Teflon material.

A unique feature of this arrangement is the simplicity and ease with which the component parts may be disconnected for resterilization without requiring a lengthy shut down of the mechanism. In this respect, the assembly 420 including the supported separator wheel 425 may be readily disengaged from the seating groove 416 in member 414 by manually disconnecting the clutch mechanism 407, 409. Obviously, a single duplicate set of each item would facilitate immediate replacement of any of the component parts in a completely sterile condition. However, it usually suffices over extended periods of operation exceeding several months in length to simply replace the hopper members 435 as they are emptied. Observation of the condition of the quantity of end closure caps within the hopper is readily had via pivoted lid 432.

The inclined feed chute structure 440 in its simplest form includes a channel-shaped rail 441 of stainless steel having a covering 442 overlying the open mouth of the channel to form an enclosed passageway 433 (see Fig. 29). According to the invention, the chute is divided into readily disconnectable sections, the separate sections being interfitted together in endwise aligned relationship between the hopper feed assembly and a cap applying assembly 500 positioned to overlie a conveyor 60. The conveyor comprises an endless chain 135 carrying spaced clamp blocks 65, each block including separatable sections having a central recess which mate to form a pocket for receiving vials A. A further track section 448 connects with track section 440 midway of its descent and forms a guideway directing a line of closure caps to a second cap applying mechanism overlying an identical parallel conveyor assembly (not shown). Track section 448 includes an open mouth at its upper leading edge which, as shown in Fig. 30, is adapted to be received within an opening in the side of rails 440 and semi-permanently supported thereby by an anchor pin 447 carried on the upper side of the rail member and a cooperating pivoted clamp arm 449 carried on section 440.

The integrated track sections of Fig. 2b are supported intermediate their descent by means of an arm 453 projecting from a stanchion support assembly and carrying a pivoted clamping linkage 450. The clamping linkage 450 is more clearly shown in Fig. 29 and includes a manually operable lever 451 pivotally carried on a stationary bracket 452 projecting from the support arm 453 and is connected by means of a linkage 454 to a clamp member 455 which is adapted to move into a pressure fit with the upper surfaces of two track sections adjacent their aligned ends. The linkage 454 and lever 451 are so constructed and proportioned as to provide a self-locking action in which plate member 455 may be positively held against the track sections under pressure to retain the sections as integral assembled units and yet allow rapid dis-assembly for purposes of replacement.

*Details of the closure cap sorting mechanism*

A cap inspecting and ejecting mechanism 460 is positioned to cooperate with the feed chute above the track division. This mechanism is more fully illustrated in Figs. 25, 26 and 27 and is operated by a drive motor 461 on the main support assembly 1000. As shown in Fig. 2b, motor 461 includes a right angle gearing arrangement (not illustrated) having a laterally projecting driving shaft 464. The shaft 464 includes a clutch member 462 (see Fig. 25) for cooperating with a second clutch member 467 carried by a driven shaft 468 projecting from a cylindrical support element 470 carried by track 440. A spring 469 is interposed between a hub 466 on shaft 468 and clutch member 467 which is axially movable on the shaft by reason of a pin and slot connection 466. The clutch mechanism 462, 467 is of the overload type and is adapted to continuously drive shaft 468 so long as the torque load does not exceed a predetermined amount, and upon the occurrence of which condition the respective clutch members will disengage, member 467 being permitted to move axially rearwardly out of engagement against the resilient force of spring 469.

The driven shaft 468 includes a sleeve extension 471 having a central bore or channel 472 and a radially directed passageway 473 communicating with the channel intermediate its length. A push rod 474 is positioned in channel 472 and includes an outer cam follower arm or component 476 and a cap ejecting terminus 478. A spring 477 is positioned in the bore 472 between the end of drive shaft 468 and the movable pin 474 in such manner as to normally continuously urge pin 474 axially outwardly of the hub member. This action serves to move cam follower arm 476 into contact with a cam surface 479 on stationary member 470 and which surface is so configurated that upon rotation of shaft 468 and therewith extension 471, the pin 474 is retained in a retracted position for substantially 180° of rotation. However, the pin is substantially immediately released from restraint on further movement of the shaft to permit spring 477 to urge the pin forwardly in the bore whereby terminal end 478 moves axially outwardly of the sleeve 471 into the cap feed chute. Sleeve 471 further includes a semi-cylindrical cup-like structure 480 on its forward end and which structure is positioned to intersect the feed chute 440 to block passage of the conveyor caps therewith.

As will be more readily understood by reference to Figs. 26, 27 and 31 of the drawings, the relative radial positioning of the cup member 480, cam 479 and cam follower 476 on pin 474 are so arranged as to permit sleeve 471 to rotate approximately 180° during which time the cup member 480 moves from a position with its open end inverted vertically downwardly (see Fig. 26) to a position in which its open end is directed vertically upwardly. At this point in the operation, a closure cap lying in the track above the cup member will move under the effect of gravity and the weight of additional caps in the trackway into registry with the cup member. This slight further rotational movement of sleeve 471 has sufficed to move cam follower 476 from the high point 479' (see Fig. 31) of cam 479 to the low area thereof with the result that spring 477 snaps pin 474 forward so that terminal end 478 moves into contact with the closure cap seated in cup 480.

The arrangement is such that if the closure cap is oriented with its closed end positioned to face right, as are caps B and D in Fig. 25, the pin 474 will enter the cap but without touching the same unless the cap is deformed or mashed, in which condition the force of the pin will eject the cap laterally from out of the chute through an opening 446 in the feed track 440. On the other hand, should a cap enter the cup in a position which is inverse to that previously referred to (see cap C in Fig. 25), movement of pin 474 axially of sleeve 471 will eject the cap by contact of the terminal end 478 of the pin with the enclosed end wall of the cap, in like manner to the ejection of deformed caps which are properly oriented. The ejected caps are received within an enclosed chute member 481 (see Fig. 2b) interchangeably received within a clamp structure 482 carried on the feed track.

The collecting assembly 481 is adapted to convey the deformed and improperly oriented caps to a common receptacle and/or conveyor means for return to a common source of supply. In some instances, it may be desirable to provide a baffle structure in collecting chute 481, positioned with respect to the discharge opening 446 in such manner that the difference between the force of ejection of mechanism 460 on defective and improperly oriented caps, respectively, is availed of to separate the improperly oriented from the crushed and/or deformed caps. Such arrangement in its simplest form may comprise a baffle plate which will deflect the improperly oriented caps into one terminal passageway while permitting the deformed and/or crushed caps having less wind resistance to pass thereover into a second terminal passageway.

Those caps which pass the inspection station are upon further rotation of cup member 480 permitted to drop from out of the cup member to continue downwardly on the chute to the cap applying station 500 (see Figs. 2b, 28, 32 and 33). A duplicate station (not shown) is provided at the end of feed chute 448. According to the present construction, the feeding takes place as a simple gravity induced action with division of the feed to chute 448 occurring when the lower chute portion of track 440 is filled. In practice, both chute sections are normally continuously filled with cap members so that additional members supplied from chute 440 merely serve to replace those ejected from the chutes via the cap inspecting unit.

*Details of the closure cap positioning and applying mechanism*

The feeding of the caps from each of the chutes into the respective cap applying structures will be understood more particularly as follows. As shown in the figures, the chute 440 registers with an ejection chamber having a guide block 502 with a vertically directed passageway 503. The passageway 503 supports a reciprocating plunger member 505. At its lower end the guide block carries plate members 507 forming a first passageway registering with the feed chute 440, and a second axial passageway 509 parallel to the feedway 440. The plate members also support a dividing wall 506 having an integral cam surface 506' (see Fig. 33) for a purpose hereinafter apparent. A drop-out opening 511 (see Fig. 32) is positioned at the terminal end of the first passageway in the lower floor surface of the plate member directly beneath the passageway 503 for the purpose of permitting the closure caps to be ejected vertically downwardly onto the close end of a filled cartridge on the conveyor blocks 65 as the same proceeds directly beneath the opening 511.

The closure caps are preferably positively retained within plates 507 in a position overlying the drop-out hole 511 by means of a detent arm 513 pivoted on the plate and urged under the effect of a spring 515 to abut the side of a closure cap and clamp it against the opposed guide wall of the plate. In practice, the spring 515 is so calibrated as to normally urge detent lever 513 transversely of the passageway to slightly less than half way across. This arrangement normally blocks the gravity feed of the closure caps from out of the feed chute through the drop out opening 511.

Means to progressively and selectively feed the closure caps from the chute are positioned in the second passageway 509 and as shown in Fig. 33 comprise a slidable finger member 517 having a cap engaging tongue 518, a control cam surface 519, and an operating arm 516 carrying an actuator pin 520. The finger member 517 is normally urged laterally of the passageway by a leaf spring 521 to bring the control cam 518 into contact with the dividing wall 506 which upon retraction of the finger member from the position shown in Fig. 33, serves to prevent the tongue portion from contacting a cap positioned in the central feed passageway 440'. The dividing wall cam surface 506' terminates a short distance in front of the drop out opening 511 as shown in Fig. 33, in order that axial reciprocation of the finger member toward the closed end of the chute will serve to permit the finger member to protrude into the cap passageway and bring the tip portion 518 into contact with a closure cap which had previously been blocked by the pivoted detent finger 513. With this arrangement continued movement of the finger member in an axial direction will serve to force the detent 513 to pivot against the action of spring 515 thus permitting the closure cap to enter into registry with the drop out opening 511.

Ejection of the caps from plate 507 is obtained by reciprocating plunger 505 which is normally retained in a raised position by a spring 504 (see Figs. 2b and 28), under the action of a servo motor 525. As shown more fully in Fig. 28, the servo motor is preferably of the fluid pressure differential type and includes a stationary cylinder 523 supported on a bracket 530 and a reciprocable plunger shaft 522 fixedly connected with the movable piston in the cylinder. The plunger shaft passes through a bearing block 531 projected from bracket 530 which serves to align the end thereof with the upper end of plunger 505 in block 502. Although not necessary, it is usually preferred to include a helical spring (not shown) between support block 531 and a headed portion on the end of piston shaft 522 in order to eliminate any slack or backlash in the operation of the piston. A fluid supply line 526 communicates with the upper end of cylinder 521 and connects with a control valve assembly which is shown graphically at 535 in Fig. 37 intermediate its extent and a source of fluid under pressure.

A second servo motor of the fluid pressure differential type 540 is also supported from bracket 530 and includes a cylinder 541 which is fixedly connected to the bracket and a reciprocable piston (not illustrated) having an axially extending piston rod 542. The rod 542 is fixedly connected with a control plate 545 having a slotted end portion 546 presenting a recess for receiving pin 520 of the finger member 527 of the cap feed structure. Plate 545 includes a stabilizing bearing block 547 (see Fig. 28) which is adapted to slide over a fixed guide pin 549 mounted in the leading face of stationary cylinder 541 (see Fig. 33). The arrangement is such that the reciprocation of the piston and connected rod 542 serves to move plate 545 to in turn move slide member 517 to positively force feed the closure cap members progressively into registry with the drop out opening 511.

Control of servo-motor 540 is obtained by means of a valve assembly 550, Fig. 28, mounted on bracket 530 adjacent servo motor 525. This valve assembly includes an inlet line 551 from a suitable source of fluid pressure (not illustrated) and an outlet line 552 connecting the vial with piston chamber 541. The control valve includes a plunger 555 connected to be reciprocated by a pivoted lever 556 which in turn is actuated by a cam 558 on a control shaft 925. The lever 556 is pivoted to the valve body in a conventional manner as illustrated at 557.

The control valves 535 and 550 for the servo motors are synchronized so that the motor unit 540 first operates to force feed a new closure cap into position overlying the drop out hole, and then the motor unit 525 operates to press slide rod 505 through passageway 503 into contact with the retained closure cap to cause the same to move out of hole 511 onto the neck of an underlying cartridge as shown more clearly in Fig. 32 of the drawings.

In order to facilitate rapid and easy disassociation of the feed chute mechanism for sterilization or cleaning, the support bracket 530 includes, as shown more clearly in Fig. 28, a pivot plate 532 supporting a linkage 565 and comprising a manually operable lever 566, a pivot link 567, and an operating arm 568. Arm 568 carries a pressure plate 569 which is adapted to bear against block 502 to clamp the same against bracket 530 and hold the block, attached plate, and feed chute in a firmly secure, vibration free grip. Removal of the feed chute section is readily facilitated by manually depressing the exposed end of lever 566 while simultaneously pulling on it axially to pivot link 567, whereby arm 568 is pivoted to withdraw the pressure plate from engagement with the block. Thereafter, the block, the plate and feed chute section can be laterally withdrawn to completely free the components.

*Details of the closure cap spinning mechanism*

After the closure cap is positioned on the exposed neck of the cartridge A supported in the conveyor block 65 (see Fig. 32), the conveyor proceeds to an adjacent station for a cap-spinning operation which will serve to physically clamp the metal closure cap over the annular neck of the cartridge in a substantially fluid-tight seal. As shown more particularly in Figs. 34 and 35 of the drawings, the sealing station comprises a cabinet 570 housing a motor driven spinner unit 600 which is adapted to vertically reciprocate onto the closure cap covered cartridges as they proceed beneath the unit on the conveyor. Cabinet 570 comprises a housing 571 which is supported from the common apparatus support 1000, as shown in Fig. 2b, and encloses an electric motor 572 carried in bearings supported by a frame 592 depending from a support yoke 591 including upstanding legs 594 and an integral yoke 596. The yoke 596 in turn is suspended by means of a spring 598 from a stationary arm 573 integral with housing 571.

Support unit 591 also carries a sleeve member 590, having rack-type gear teeth 593 along one side thereof for cooperation with a rotatable gear member 595 supported in the wall of housing 571. The lower end of the sleeve member 590 extends through an offset portion of the housing and terminates in an enlarged boss or collar 590'. The arrangement is such that sleeve 590 and motor unit 572 are resiliently urged against the action of gravity in a vertical upward direction under the action of spring 598 to normally retract the sleeve member 590 away from the cartridge carrying blocks of the conveyor.

Motor 572 operates a drive pulley 574 which is adapted to be connected via a belt (not shown) to a driven pulley element 575 fixedly connected to the upper end of a rotatable sleeve shaft 576 supported for rotation within the sleeve member 590. Shaft 576 extends the length of the sleeve member 590 and terminates in the region of boss 590' in an enlarged threaded recess 578 for a purpose hereinafter apparent. A further shaft or stationary rod 580 is positioned to extend through the center of the sleeve shaft and connects at its lower end in the region of the threaded recess 578 with the spinner unit 600. At its upper end the rod 580 carries a fixed abutment ring or flange 582 and terminates in a threaded extension 583. A spring 584 is positioned about shaft 580 between flange 582 and a rectangular, bell-shaped collar member 585, which is normally received within a mating opening in the yoke 596. The collar member 585 includes a flared terminal end 586 which normally abuts against the lower edge of the support unit 594, 596 under the action of the spring 584.

Preferably, shaft 580 is formed to have a non-circular, as for example, a rectangular cross-sectional contour, in the region of collar member 585 for the purpose of being slidable, but non-rotatably received within a similar central opening in the collar member for the purpose of retaining the shaft or rod 580 against turning while permitting axial reciprocation of the same. The arrangement of the spring 584 is such that it normally maintains the rod 580 in its lower extensible position in which the collar member 581 projects into a central recess or channel-way 610 in the spinner mechanism 600.

A simple friction brake unit is provided to hold the sleeve shaft from rotating when assembling and disassembling the spinner unit to the sleeve shaft. It comprises a threaded rod 579 mounted in the casing side wall 571 and adapted to be moved toward or away from the sleeve shaft by means of a control knob 577. It will be understood that rod 579 binds the sleeve shaft against rotation when tightly threaded thereagainst.

The means for controlling movement of sleeve member 590 and the contained shaft 576 and rod 580, according to the present invention, takes the form of a simplified cam-actuating structure, shown more particularly in Fig. 35 of the drawings. As therein illustrated, the actuating gear 595 which normally meshes with rack teeth 593 on the sleeve member 590 is mounted on a common shaft 599 extending through the housing wall and carrying at its external end a driving gear member 597. This gear member in turn is connected via a sprocket chain 599' to the end of a pivoted lever 957 supported on a pin 956 carried by housing 570. Lever 957 is adapted to be actuated in a vertical direction to turn gear 597 by means of sprocket chain 599 through a cam follower member 955. The follower is pivotally connected to the lever at 958 and carries an adjustable cam follower yoke 952 supporting an idler roller 951. The roller is adapted to ride upon a cam member 950 fixedly carried by the main control shaft 925, and by reason of the contour of the cam, causes the follower 955 to move vertically upwardly and downwardly over a guide pin 954 projecting into a slot 953 formed in the yoke 952 to thereby rock lever arm 957 and wrap and unwrap chain 599' about the gear element 597.

The closure cap spinning unit 600 is formed as a radially disconnectable section which can be removed from the main assembly 570 for purposes of sterilization, repair and the like with a minimum of handling. The spinner unit includes a carrier or cage member 601 which is provided with three spaced depending and radially extending support yokes, only two of which are partially illustrated in the drawings at 602 and 603. Each of the support yokes are adapted to independently suspend pivoted spinner support members comprising three in number, only two of which are illustrated at 611 and 613 in the figure. The depending spinner members are pivoted for movement radially of the carrier member as shown at 617 and 619, respectively, in the figure. The carrier cage 601 is formed at its upper end to have an axially extending externally threaded neck 605 for threadedly engaging the lower internally threaded end of sleeve shaft 576 in order to connect the carrier to the sleeve shaft for rotation therewith. The carrier neck forms a boundary for a relatively large recess or channelway 610. The central channelway is adapted to receive and seat a detachable connector device centrally supported in the channelway and forming a removable extension of rod 580. The detachable connector comprises an integral assembly of a lower closure cap contacting stud or pressure head 615, a central cam element 618, and an upper connector hub 620. Hub 620 is internally threaded for mating engagement with a threaded tip on the end of rod 580. Hub 620 further includes an external axially directed slot 622 which receives a movable locking plate 625 which in turn is adapted to be selectively movable against a serrated disc 581 adjacent the lower end of rod 580 for locking the detachable connector with the rod.

The pivoted spinner member elements 611, 613 of the cage member are provided with adjustable cam follower elements at the upper end thereof, the followers preferably taking the form of conventional screw elements 609'. The lower end of each of the spinner members carries freely rotatable metal turning rollers 614 and 618, respectively, for an obvious purpose. As will be readily understood, the arrangement is such that upon movement of the spinner shaft 576 vertically downwardly by gearing 595, 593, the spinner members 611, 613 move with respect to the central stud element 615 bearing the control cam 618. This movement causes the cam followers 609' on the upper ends of the spinner members to ride out on cam 618 and to pivot the spinner members so as to bring the metal rollers 614, 618 radially inwardly to contact the metal carrier cap on the vials.

The operation of the cap-spinning mechanism 570 will be more readily understood with reference to Fig. 34 of the drawings. In accordance with the invention, after cap positioning unit 500 has seated a metal cover cap over the cartridge and the conveyor has transported the covered cartridge to beneath spinner unit 600, the control shaft 925 has rotated a sufficient amount to begin raising follower arm 955 to thus initiate lowering of the spinner mechanism into position over the covered cartridge by means of the rack gearing 593, 595. Rotation of gear 595 through the mechanism of Fig. 35 causes sleeve member 590 and therewith support unit 591, 594, 596 to move downwardly together as a unit. Since shaft 576 is carried within sleeve member 590 and rod 580 is normally resiliently urged downwardly by spring 584, the lowering movement of the support unit carries with it rod 580 so that the sleeve shaft and the rod and therewith the attached spinning unit 600 move together as integral assembly.

As the spinner assembly approaches a closure cap on an underlying cartridge, the pressure head 615 of the central rod member contacts the upper surface of the cap and automatically centers itself by reason of a guiding recess in the end of the stud shaft. As this action takes place, further downward movement of rod 580 is arrested, but the sleeve member 590 with shaft 576 continues moving downward for a slight distance to bring the peripheral edges of the rollers into alignment with the trailing rim of the cover cap. As previously indicated, this further movement of the sleeve shaft causes the spinner cage with its spinner members to move relative to the immobilized central stud shaft assembly whereby the cam follower screws on the spinner members ride radially outwardly on cam 618 to rock the spinner members transversely of the pressure head to clamp the roller member against the closure cap on the cartridge. Since, as hereinbefore indicated, the sleeve shaft 576 is normally continuously rotated, movement of the metal rollers 614, 618 into contact with the closure cap will take place under conditions providing a metal spinning operation on the edge of the closure cap in a manner well known in the art to lap or crimp the rim edge of the closure cap beneath the annular shoulder of the glass vial or cartridge. There is thus formed a substantially fluid-tight permanent seal with the rubber stopper in the end of the cartridge being tightly compressed against the leading rim face of the cartridge. Upon completion of the spinning operation, the spinner assembly is resiliently returned upwardly by both springs 598 and 594 which substantially completely eliminate any backlash in gearing 593, 595. At about the same instant, the main control cam 590 initiates raising of the spinner assembly, and the conveyor then moves the sealed cartridge to the next station for application of a sterile needle assembly. Although the above description has been made with respect to the closure cap applying and sealing components associated with conveyor 60 of the machine, it will be appreciated that duplicate stations corresponding to the applying mechanism 500 and the sealing mechanism 600 are provided for the parallel conveyor 60a.

A particular feature of the instant construction in which the ferrule closure members are independently positioned on the vials prior to being sealed thereon as they substantially complete elimination of defective seals. This permits the respective components to operate at unusually high rates of speed not heretofore obtained in operations involving the physical crimping of a metallic member to a delicate glass structure. Many other apparent and inherent advantages, forming no part of the presently claimed invention, will be apparent to those skilled in the art as resulting from the particular construction utilized herein.

After completion of the sealing operation, the conveyor moves the cartridge to the next station where a covered needle unit having a construction identical with that shown in Fig. 15 of the drawings is to be positioned on the sealed end of the cartridge. This needle applying mechanism has been generally described previously but will be more fully understood by reference to the following detailed description of the associated mechanism comprising the same.

*Details of the needle hoppering mechanism*

As previously pointed out, the hopper 700 is adapted to receive a large supply of covered needles, and for this purpose, comprises a generally frusto-conical chamber 702, preferably formed of stainless steel or some other well-known corrosion-resistant material. The chamber 702 includes a radially directed flange 704 surrounding an open mouth forming an outlet for the chamber. At its other end, the frustro-conical hopper includes a cylindrical base section 706 which carries internally thereof a plurality of spaced scoop-like elements 708 for the purpose of receiving individual covered needles and vertically lifting the needle as the hopper is rotated to a point overlying the feed chute mechanism 725. The feed chute advantageously projects through the open mouth of the hopper into proximity with the scope elements 708.

The hopper assembly is mounted for rotation upon three roller elements, only two of which, 701 and 703, appear in the drawing. It will be understood, however, that a further roller member identical to roller 703 is provided opposite the roller 703 on the other side of the hopper. Rollers 701 and 703 are formed to have a dumbbell-like shape, roller 701 being positioned directly under flange 704 along the vertical center line of the hopper and serving to effectively limit any axial displacement of the same. On the other hand, roller 703 and its mate (not illustrated) are positioned at diametrically opposite points on the basal periphery of the hopper substantially midway of the cylindrical base 706 and serve to prevent any lateral (transverse) displacement of the hopper. The rollers are supported upon a table 750 carried on common support 1000 by means of bracket members 751 and 753. A drive motor 752, which may be of any conventional form, preferably a fractional horsepower electric motor, is also carried by table 750 and is connected to rotate roller member 703 to frictionally drive the hopper. It will be readily appreciated that the present arrangement provides an exceedingly simplified structure of an inexpensive nature which is readily disconnectable for purposes of sterilization, repair and the like.

*Details of the needle feeding and inverting mechanism*

As previously indicated, the covered needles are directed from the hopper assembly 700 in sequence by means of a feed chute arrangement 725. As will be more readily understood by reference to Fig. 2c, of the drawings, the feed chute comprises a pair of transversely spaced guide plate members 726, 728, which are fixedly positioned apart a predetermined width by means of bolt elements 727 and space members 729. The upper end of the feed chute projects through the open mouth of the hopper into proximity with the scope elements 708 and includes a pair of opposed angularly directed upstanding guide ears 730 and 732. The lower end of the feed chute is sharply curved downwardly as shown at 735 in Fig. 2c and is provided with a plurality of upstanding pairs of support arms 731, 733 for maintaining a curved guide rail assembly 734, 736 in juxtaposition to the chute 725. At its lower terminus, the chute 725 is integrally connected with the inverting structure 740.

The inverting assembly comprises a second chute-like arrangement having a curved integral guideway providing vertically upstanding guide walls 742 and a vertically curved floor 741, the floor 741 merging with sidewalls 742 at the lower end of the chute-like structure to form a circular guide neck 743. At its upper-end, floor 741 is formed integral with a semi-cylindrical seating area 745, the area 745 serving as a repository for receiving the covered flesh piercing end of the needle assembly as they are discharged from out of chute 725 and facing the stoppering piercing end toward the lower outlet mouth 744 (Fig. 36) of the guideway. The semi-cylindrical section 745 is in turn fixedly connected as by welding, bolting, or the like with a guide sleeve or tube 764 supported on a bearing plate 763 on the common support 1000. Sleeve 764 in turn receives the extended end of a piston rod 762 projecting from cylinder 761 of the servo motor 760, the cylinder 761 also being mounted on the common supoprt 1000. The arrangement is such that the needle assembly in seating area 745 is aligned with rod 762.

The spacing between the guide plates 726, 728 of the feed chute 725 is such that the covered needle assembly which, is truncated to have an enlarged sleeve extension 880 surrounding the stopper puncturing end of the needle will ride upon the upper edges of plates 726, 728 to depend the flesh piercing covered portion of the needle between the plates in the manner illustrated in Fig. 2c. With this arrangement, simple selection of a suitable gradient for the chute 725, as determined by the weight and center of gravity of the needle assembly, will serve to continuously and faultlessly gravity feed the needle assemblies from their first contact with the feed chute between guide ears 730, 732 within the hopper mechanism to their ultimate rest position in contact with reception area 745 and the floor 741 of the inverting structure 740. It will thus be understood that energization of the servo motor 760 with the needle assembly positioned as indicated in the figure, will serve to eject the needle down the sloping floor 741 through the guide neck 743 into the positioning mechanism 790.

*Details of the needle positioning and applying mechanism*

As shown in Fig. 2c, the needle positioning mechanism 790 is mounted directly beneath a needle applying mechanism 770 comprising a fluid pressure differential servo motor having a cylinder 771 fixedly retained in a vertical position by means of yokes 861 and 862 extending from a vertical stanchion 860 rising from the common support 1000. The servo motor includes a reciprocable piston element 772 which is provided with a fixed cross member 773 to which is attached a pair of biasing springs 774, the springs in turn being connected to a cross pin 776 carried by the stationary cylinder 771. With this arrangement, piston rod 772 is normally retained in its upper limit position in which cross bar 773 abuts the end wall of the cylinder.

The extended end of the piston rod is provided with an adjustable coupling member 778 which in turn detachably carries a needle applying rod 775, the rod being so positioned as to be centered within the guiding neck 743 of the inverter mechanism 740. The lower end of the applying rod is recessed as indicated at 776 in Fig. 2c for the purpose of receiving the conical end of the cover of the needle assembly to firmly and positively center the needle in a manner hereinafter apparent.

The needle positioning mechanism is more particularly illustrated in Fig. 36 of the drawings and includes a stationary support 755 comprising opposed, upright stanchions 757 and 758 connected by a cross piece 756 which serves as a supporting table for the inverter structure 740. The cross piece 756 carries an upstanding peg 759 which is adapted to cooperate with a notch 747 carried in the flared base 746 of the inverter chute for fixedly retaining the inverter assembly and drop out opening 744 in precise alignment with the cover positioning mechanism 790. A latching arm 765, pivotally mounted as at 768 to the cross piece 756, includes a configurated recess 767 for frictionally abutting the curved side of the inverter unit and locking the unit in proper position with notch 747 centered on peg 759. The lever includes a dowel pin, or the like, guide means 768 and a threaded locking knob 769, the arrangement being such that tightening of knob 769 serves to frictionally lock the dowel pin 768 against the under surface of cross piece 766 to hold the inverter unit in a predetermined position.

The guide neck 743 of the inverter unit extends through an opening in cross piece 756 between a pair of opposed clamping jaws 792 and 794 mounted for reciprocable movement toward and away from each other on opposed guide pins 791 projecting from the respective stationary stanchions 757 and 758. For this purpose the clamping jaws carry centrally perforated cooperating boss members 793 which ride on the pins 791. Each of the clamping jaws is centrally grooved in a vertical direction to present opposing slot-like recesses 797 and 799 of varying depth having radial shoulders as shown at 796 and 798. The offset shoulders of the recesses cooperate to receive the lower end of guide neck 743, the extended end of the applying rod 775 (which projects through neck 743 to midway of the height of the clamping blocks) and the filled cartridge assembly A whereby all of the components may be vertically aligned simultaneously.

Inspection of Fig. 36 will further indicate that the lower end of the clamping blocks extends to proximity with the upper surface of the closure blocks 65 in such manner that as the blocks are moved together, the supported cartridge vial A is clamped between the blocks, the lower recess shoulder 798 being gradually sloped outwardly of the respective blocks to form a narrowing pocket or groove when the blocks are in clamping position. With this arrangement, vertical movement of rod 775 in a downward direction will thrust the needle assembly axially downwardly whereby shoulders 798 center the open end of the needle cover and readily guide it to proper position in alignment over the sealed end of the vial A with the stopper piercing end of the needle overlying the recess 353 (see Fig. 2c) in the stopper.

Movement of the control blocks toward and away from each other is controlled by means of a cam and linkage arrangement from a main drive and control shaft 925. As shown in Fig. 36, clamping block 792 is pivotally connected with a link 787 which in turn is pivotally connected to a further link 789. Link 789 has its free end pivotally mounted on the stationary stanchion 757. This forms a toggle linkage in which the pivot center is in turn pivotally connected to a cross bar element 785, the bar 785 being pivotally connected as at 788 to a rockable lever 781. Lever 781 is mounted for rotation about a fixed pivot 782 on stanchion 758 and at its lower free end is pivotally connected to a further link 783. Link 783 is in turn pivotally connected to the clamping block 794. The upper end of lever 781 carries a plate 786 mounting a rotatable cam follower 996 which is adapted to cooperate with a cam 995 carried on control shaft 925. The follower is normally retained in contact with the control cam by means of a spring 787 connected between the upper end of lever 781 and a bracket on the main support 1000.

From the above description, it will be apparent that linkage 780 comprises an equal force toggle mechanism which synchronously moves clamping plates 792 and 794 toward and away from each other as cam 995 and shaft 925 rotate. As will be readily understood, the relative positioning and contour of cam 995 is so arranged that the clamping blocks are moved apart as conveyor 60 moves an assembled vial A between the clamping blocks 792 and 794. As the conveyor is intermittently operated, the support block 65 and cartridge A are arrested midway of clamp blocks 794 and 792, at which time the control cam 995 operates linkage 780 to move the clamping blocks together. As the clamping blocks are moved toward clamping engagement, the servo motor 760 (Fig. 2c) is energized to eject a needle from reception area 745 whereupon the needle moves down the inclined floor 741 of the inverter into engagement with the clamping jaws at about the lower shoulder 798 in a position which is directly above the vial and in alignment therewith and with the end of applying rod 775. At substantially the same instant, the cylinder 770 is energized to move the piston rod 772 against the bias of springs 774 to bring rod 775 into engagement with the flesh piercing covered end of the needle assembly, in the manner illustrated in the figure, to force the needle assembly down over the upper end of the vial assembly. As will be readily understood, this action serves to imbed the leading end of the needle within the puncturable rubber stopper in the vial, and at the same time, to frictionally slip the cover sleeve 880 (Fig. 15) over the metallic closure ferrule surrounding the vial stopper to provide a firmly united and readily handled completed hypodermic syringe cartridge.

*Details of the ejector mechanism*

After the needle unit is fitted on the cartridge, the assembled units can be rapidly and easily discharged at a point 980 on the return run of the conveyor. This vial discharge mechanism is illustrated in Fig. 12 of the drawings and comprises a plate or wall member 197 positioned on the inside of the conveyor track and supporting the upper guideway plate 191 and a centering block 184. A further pair of guide plates 198 (only one of which is illustrated in the figure) are positioned on the other side of conveyor 60 at a distance apart, axially of the conveyor, which is slightly greater than the length of a single block 65. The spacing between plates 198 is such that block section 165 can move laterally therebetween. As will be understood, walls 198 extend transversely of the conveyor for the purpose of stabilizing the movable block section 165 as the block is opened to discharge an assembled vial cartridge through the opening 186 between runners 195.

This discharging operation is accomplished by a structure which is similar to that provided for receiving the vials on the conveyor at the stopper-plunger insertion station and comprises a reciprocable rod 180 mounted to slide in a bore 182 in centering block 184. The ejector rod 180 carries a headed end 188, and a spring 189 is positioned between the block 184 and head 188 to normally urge rod 180 to a retracted, non-operative position. Head 188 in turn contacts the lower end of a follower arm 965 pivotally mounted on a bracket 185 as at 183. The arm 965 is rocked about pivot 183 by a cam 967 on control shaft 925. It will be understood that an identical arrangement is provided for conveyor line 60a.

*Details of the drive and control mechanism for the machine*

Fig. 37 shows the main drive and control mechanisms employed for operating the two assembly lines of the machine of this invention. Basically, it consists of two control and drive shafts 925 and 925a which are driven from a motor 927 via belting and clutch devices 929 and 929a. Since both lines are identical, this description will be confined to the line operated by shaft 925.

From an inspection of the drawings, it will be seen that shaft 925 carries a bevel gear 931 which meshes with a second double gear 933 and through an intermittent drive mechanism comprising a driven ratchet wheel 935, and a driving pawl 937 rotates a sprocket drive wheel 939 in a step-wise or intermittent manner. The sprocket wheel forms a driving element about which the endless chain 135 of conveyor 60 carrying supporting blocks 65 is engaged. A further idler sprocket (not illustrated) engages the other loop of chain 135 to form an endless path along which the cartridge supporting blocks 65 travel.

Adjacent its other end, shaft 925 is provided with a crank plate 943, which in turn is connected to reciprocate a linkage 945 associated with the star wheel 68. The arrangement is such that rotation of shaft 925 moves linkage 945 to index the star wheel and feed individual vials from vial hopper 59 into the vial feed chute 63. Adjacent the crank plate 943, shaft 925 carries a further bevel gear 949 which meshes with a bevel gear 951 connected to operate a ratchet wheel 953 via a pivoted pawl operating lever 955 on a crank unit 957. The crank is connected to rotate with gear 951. The ratchet wheel 953 is fixedly mounted on a driven shaft 141 extending from housing 40 of the plunger stopper insertion station (see Fig. 5). As previously pointed out, the shaft 141 is adapted to rotate both vial wheel 57 and horizontal plunger stopper insertion wheel 49.

A cam 947 is carried by the main control shaft 925 adjacent gearing 949, 951 and is adapted to actuate a control linkage 147 connected to reciprocate the knockout bar 139 (see Fig. 11) employed to open blocks 65 as they become situated beneath vial wheel 57 (see Fig. 5). A further cam 962 is carried by the crank member 957 and in turn is adapted to control a valve unit 959 through a follower arm 958. Valve unit 959 is interposed between pneumatic cylinder 120 of the plunger stopper insertion mechanism and a source of compressed air 923 in a control line 926. An adjacent control cam 961 on shaft 925 is adapted to operate a further control valve 963 via a follower arm 962 to control the delivery of air to the ejection head 131 serving to eject broken vials from the pockets 55 of the vial wheel. The valve 963 is interposed between a conduit 133 leading to head 131 and a delivery line 928 communicating with the source of fluid pressure 923.

Shaft 925 carries a first plurality of operating cam members 970, 217 and 974. Cam 970 is connected via a follower arm 972 to actuate a control valve 270 having an inlet to the source of compressed air 923, via conduit 930, and an outlet conduit 278 to the servo-motor 259 of the plunger inspection mechanism. Cam 217, as previously more particularly described, is connected to raise and lower the yoke assembly 215 for actuating pump 207 to fill the cartridge vials with a medicament. Cam 974 is connected via a follower 976 to a further control valve 280 which is connected with the source of fluid pressure 923 by an inlet conduit 932 and which includes an outlet conduit 288 leading to the servo-motor 256 for the stopper insertion mechanism.

The control shaft also fixedly carries a second plurality of control cams 538, 558 and 950. The control cam 538 is connected to operate a follower arm 538' which in turn actuates a control valve 535 in a supply line 526 to the closure cap applying servo motor 525. The control cam 558 is connected to operate a follower arm 558' which in turn is connected to actuate the control valve 550 for supplying pressure fluid through line 552 to the cap positioning servo motor 540. Fluid pressure is supplied to control valves 535 and 550 from a common source 923 through 923'. The cam 950, as more particularly described previously, is connected to actuate the linkage mechanism for raising and lowering the spinner assembly 600 in the cap spinner housing 740 in which the control shaft 925 is journalled.

Shaft 925 further carries a third plurality of cam members 967, 992, 998, 947 and 995. Cam 967 actuates a follower linkage 965 which in turn operates a kick out mechanism 980 (Fig. 12) for engaging the movable bar 170 on the conveyor blocks 65 along the return run of the conveyor chain 135 to eject the completed assembly from the machine. Cam 992, as previously described, operates follower 994 and therewith valve 835 to control the servo motor 770 of the needle applying mechanism. Cam 995 operates follower linkage 996 to actuate the toggle mechanism 780 for controlling movement of the vial clamping members 792 and 794 of Fig. 36. Cam 998, as previously indicated, operates a follower 990 connected to control valve 820 in cooperation with solenoid 808 for the purpose of controlling the condition of servo motor 760. The source of fluid under pressure 923 is connected with the respective control valves 820 and 835 for an obvious purpose.

A particularly advantageous feature of the invention is this arrangement of identical, parallel drive and control shafts, operated from a common power source, and adapted to synchronize movements of the various associated operations and stations. The identity of control shafts 925, 925a provides precise coordination between the various associated operations and facilitates high speed operation of the machine without incurring breakage or defective finished articles. As will be readily understood, since these control shafts facilitate precise initiation and stoppages of desired movements in a predeterminable phased relationship, they can be utilized as the sole driving power for all components of the machine. However, it has been found more economical and expedient to employ independently energized electric motors for certain of the operations performed, as for example, the use of electric motor 403 for operating the closure cap hoppering mechanism, electric motor 901 for operating the cap ejector unit 470, electric motor 901 for operating the rubber stopper feed mechanism of Fig. 13, and the like. Obviously, these devices could be driven by one or the other of the parallel control shafts if so desired. This is generally not desirable, however, since one of the primary features of the invention is an arrangement providing an independent control of the feeding rate of the various component parts as compared with the rate of operation of the mechanisms provided for integrating the components with one another, this latter control function being driven from shafts 925, 925a.

As many apparently widely different embodiments of this invention may be made without departing from the spirit and scope hereof, it is to be understood that this invention is not to be limited, except as defined in the appended claims.

What is claimed is:

1. A machine for assembling disposable hypodermic syringes including a medicament containing vial and associated sterile needle comprising a common support structure, a pair of parallel endless conveyors on said support traversing vertically planar parallel endless paths, storage means for glass vials including means for discharging the vials in sequence, rotatable transfer wheels positioned above one end of said conveyors and having pockets adapted to receive vials from said storage means for plunger stoppers including structure for delivering and inserting plunger stoppers in said vials while supported in said wheels, means to rotate said transfer wheels whereby plunger stoppered vials can be transferred from the wheels onto the conveyors, said machine further including in sequential alignment along the path of each said conveyor a pumping means for filling said vials with fluid medicament, a closure stopper applying means for stoppering the filled vials, a metallic closure ferrule positioning means for sealing the stopper, a sterile needle assembly applying mechanism including structure for applying a covered needle over the sealed end of the said vials, and an ejector mechanism having structure cooperating with the conveyor along the return run of said conveyor for discharging the assembled hypodermic syringes, and control means including a pair of parallel cam bearing control shafts connected to the conveyors, storage means, pumping means, closure stopper applying means, needle applying means and ejector mechanism for actuating them in synchronized sequence.

2. A machine as set forth in claim 1 in which said conveying means comprises an endless chain, a plurality of clamping blocks supported on said chain, and structure connected with said clamping blocks and adapted to resiliently retain a cylindrical container therein.

3. A machine for assembling disposable hypodermic syringes including a glass vial adapted to be filled with a medicament comprising a common support structure, a pair of parallel endess conveyors, a hopper for storing a plurality of plunger stoppers, means for orienting said plunger stoppers and transporting them to adjacent each said conveyor, hopper means for storing a plurality of open-ended glass vials including structure for transporting the vials to adjacent each said conveyor, means overlying each said conveyor and including structure for inserting a plunger stopper in an open end of each vial, said overlying means including structure for transferring plunger stoppered vials to said respective conveyors, and structurally identical mechanisms positioned above the path of said conveyor and including means for sequentially filling, stoppering, sealing and applying sterile needle assemblies to said vials as said conveyor transports the vials along said endless path, a plunger stopper detector means positioned along each said conveyor path in front of said filling means and including structure for ejecting non-plunger-stopper bearing vials from said conveyors, and common control and drive mechanism for actuating each said means and said conveyors in a predetermined, synchronized, phase relationship.

4. A machine as set forth in claim 3 in which said sealing means comprises a positioning mechanism adapted to position metallic closure caps over the ends of the vials on said conveyors and an independent spinner mechanism for spinning the closure caps into a frictional fit with the vials to produce a sealed ampule.

5. A machine for storing, orienting, feeding, and associating components of a disposable hypodermic syringe comprising a common support mounting independent storage hoppers for receiving and storing a plurality of components to be assembled including cylindrical glass vials, rubber plunger stoppers, rubber closure stoppers, metallic closure caps and covered sterile needle assemblies, a conveyor for carrying a plurality of said cylindrical vials along a path in proximity with said hoppers, feeding means connecting with said hoppers and adapted to deliver said components in juxtaposition with said conveying means in a predetermined spatially oriented relationship to vertically overlie the said path, said feeding means including structure for sequentially inserting plunger stoppers in said open ended vials and depositing the plunger stoppered vials on the said conveyor, pump means for filling the plunger stoppered vials after they are positioned on the conveyor, and independent means for positioning one each of the remaining components on a filled cylindrical vial in sequence, said independent means including a spinning mechanism for frictionally working said metallic closure caps into sealing relationship over said vials, an ejection mechanism for ejecting the assembled components from said conveyor, and common control means for actuating said conveyor, feeding means, pump means, and independent means in synchronized phase relationship whereby said components are automatically assembled in a predetermined sequence.

6. A machine for assembling disposable hypodermic syringes containing a medicament from disassociated component parts in an uninterrupted automatic operation comprising a common support structure, an endless conveyor carried by said support structure and adapted to traverse an endless path, storage means carried by said common support and including structure for independently supporting the components to be assembled in the form of open ended medicament containers, rubber plunger stoppers, rubber closure stoppers, metallic closure ferrules and covered sterile hypodermic needle units, a source of medicament including means for discharging the medicament in proximity with said conveyor in predetermined measured quantities, feeding means associated with each of said storage means including mechanism for transporting the said respective components individually into proximity with said conveyor at predetermined intervals along the said endless path, said feeding means further including mechanism for orienting said respective components in a predetermined spatial relationship with respect to the said conveyor, a first assembly means carried by said support adjacent said conveyor and including structure for receiving said open ended containers from said storage means and plunger stopper members from said storage means and for inserting individual plunger stoppers in individual containers to seal one end thereof, said first assembly means also including structure for transferring plunger stoppered containers to said conveyor, an independent second, third and fourth assembly means positioned at said intervals along said conveyor path for sequentially stoppering the other end of the container, applying and sealing a metallic ferrule over the stoppered end and positioning a covered sterile needle unit on the sealed end of the container, and common control means connected with said conveyor and said respective means for actuating said conveyor and means in synchronized relationship whereby said components can be assembled in a predetermined sequence.

7. A machine as set forth in claim 6 in which said control means comprises a constantly rotating motor, a shaft connected to be driven by said motor, means connecting said shaft to intermittently actuate said conveyor and said container filling means, and cam means carried by said shaft and associated with each of said further means for actuating said means in phase relationship with the intermittent actuation of said conveyor.

8. A machine for assembling disposable hypodermic syringes from disassociated component parts comprising a common support structure, independent storage structures for receiving and supplying hollow cylindrical containers, end closure members for said containers, sealing members for cooperation with the container and an end closure, and a dispenser unit for association with the sealed end of the container, a conveyor structure adapted to receive and support said containers and transport them along a predetermined path, feeding means associated with each of said storage means and adapted to sequentially supply said respective components independently in sequence at spaced intervals along said conveyor path, said intervals being staged in such manner as to provide a first container lowering station, a second end closure applying station, a third end seal applying station, and a fourth dispenser unit applying station, a source of medicament including means for dispensing the medicament in predetermined measured quantities carried by said common support and positioned intermittent said first and second stages, said feeding means including structure for applying an end closure member to said open ended containers prior to transferring the container onto said conveyor, and common control means for actuating said conveyor, said medicament dispensing means, said feeding means and said respective component applying means in a predetermined synchronized relationship.

9. A machine for assembling disposable hypodermic syringes including a medicament containing vial and associated sterile needle comprising a common support structure, a pair of parallel endless conveyors on said support traversing vertically planar parallel endless paths, means for discharging plunger stoppered vials in sequence, rotatable transfer wheels positioned above one end of said conveyors, means to rotate said transfer wheels whereby plunger stoppered vials can be transferred from the wheels onto the conveyors, said machine further including in sequential alignment along the path of each said conveyor a pumping means for filling said vials with fluid medicament, a closure stopper and metallic cap applying means for stoppering and sealing the filled vials, a sterile needle assembly applying mechanism including structure for applying a covered needle over the sealed end of the said vials, and an ejector mechanism having structure cooperating with the conveyor along the return run of said conveyor for discharging the assembled hypodermic syringes, and control means including a pair of parallel cam bearing control shafts connected to the conveyors, storage means, pumping means, closure stopper and metallic cap applying means, needle applying means and ejector mechanism for actuating them in synchronized sequence.

10. A machine for storing, orienting, feeding, and associating components of a disposable hypodermic syringe comprising a common support mounting independent storage hoppers for receiving and storing a plurality of components to be assembled including cylindrical glass vials, rubber closure stoppers and metallic closure caps, and covered sterile needle asemblies, a conveyor for carrying a plurality of said cylindrical vials along a path in proximity with said hoppers, feeding means connecting with said hoppers and adapted to deliver said components in juxtaposition with said conveying means in a predetermined spatially oriented relationship to vertically overlie the said path, said feeding means including structure for depositing the vials on the said conveyor, pump means for filling the vials after they are positioned on the conveyor, and independent means for positioning one each of the remaining components on a filled cylindrical vial in sequence, said independent means including a spinning mechanism for frictionally working said metallic closure caps into sealing relationship over said vials, an ejection mechanism for ejecting the assembled components from said conveyor, and common control means for actuating said conveyor, feeding means, pump means, and independent means in synchronized phase relationship whereby said components are automatically assembled in a predetermined sequence.

11. A machine for asembling disposable hypodermic syringes containing a medicament from disassociated component parts in an uninterrupted automatic operation comprising a common support structure, an endless conveyor carried by said support structure and adapted to transverse an endless path, storage means carried by said common support and including structure for independently supporting the components to be assembled in the form of medicament containers, rubber closure stoppers and metallic closure ferrules and covered sterile hypodermic needle units, a source of medicament including means for discharging the medicament in proximity with said conveyor in predetermined measured quantities, feeding means associated with each of said storage means including mechanism for transporting the said conveyor at predetermined intervals along the said endless path, said feeding means further including mechanism for orienting said respective components in a predetermined spatial relationship with respect to the said conveyor, first assembly means including structure for transferring containers to said conveyor, an independent second, third and fourth assembly means positioned at said intervals along said conveyor path for stoppering and capping the other end of the container, sealing the cap over the stoppered end and positioning a covered sterile needle unit on the sealed end of the container, and common control means connected with said conveyor and said respective means for actuating said conveyor and means in synchronized relationship whereby said components can be assembled in a predetermined sequence.

No references cited.